United States Patent
Takahashi et al.

(10) Patent No.: US 7,741,838 B2
(45) Date of Patent: Jun. 22, 2010

(54) ROTATION DETECTING DEVICE AND ANTI-SKID BRAKING SYSTEM USING THE SAME

(75) Inventors: Toru Takahashi, Iwata (JP); Koichi Okada, Iwata (JP); Kenichi Iwamoto, Iwata (JP); Hiroaki Ohba, Iwata (JP)

(73) Assignee: NTN Corporation, Osaka (JP)

( * ) Notice: Subject to any disclaimer, the term of this patent is extended or adjusted under 35 U.S.C. 154(b) by 43 days.

(21) Appl. No.: 12/015,950

(22) Filed: Jan. 17, 2008

(65) Prior Publication Data

US 2008/0133100 A1    Jun. 5, 2008

Related U.S. Application Data

(62) Division of application No. 10/382,656, filed on Mar. 7, 2003, now Pat. No. 7,341,321.

(30) Foreign Application Priority Data

Mar. 8, 2002  (JP) ............... 2002-064088
Mar. 8, 2002  (JP) ............... 2002-064105

(51) Int. Cl.
   *G01P 3/00*   (2006.01)
(52) U.S. Cl. ............ 324/160; 73/1.14; 73/514.39; 384/448; 377/89; 340/870.31; 324/207.2; 324/207.21; 324/207.25; 307/112
(58) Field of Classification Search ............. 73/1.41, 73/514.39; 384/448; 377/89; 340/870.31; 324/207.2, 207.21, 207.25

See application file for complete search history.

(56) References Cited

U.S. PATENT DOCUMENTS

| | | | |
|---|---|---|---|
| 2,997,535 A | 8/1961 | Brady et al. | |
| 3,716,788 A | 2/1973 | Nishida | |
| 4,127,812 A | 11/1978 | Baliguet | |
| 4,479,390 A | 10/1984 | Meixner | |
| 4,688,951 A | 8/1987 | Guers | |
| 4,732,494 A | 3/1988 | Guers et al. | |
| 4,912,376 A * | 3/1990 | Strick | 315/362 |
| 5,053,774 A * | 10/1991 | Schuermann et al. | 340/10.34 |

(Continued)

FOREIGN PATENT DOCUMENTS

CN    2384223    6/2000

(Continued)

OTHER PUBLICATIONS

A Transponder IC for Wireless Identification Systems; Wu, Sau-Mou; 1996; IEEE; pp. 238-241.*

(Continued)

*Primary Examiner*—Khoi Tran
*Assistant Examiner*—Nikhil Sriraman

(57) ABSTRACT

A rotation detecting device that includes an electric power generator having a stator and a rotor, said rotor having a plurality of alternating opposite magnetic poles in a circumferential direction of the rotor, at least a first magnetic sensor mounted on either the stator or a support member for supporting the stator and operable to detect the alternating opposite magnetic poles in the rotor; and an electric power supply circuit for utilizing an electric power generated by the electric power generator as an electric power source for the at least first magnetic sensor.

4 Claims, 16 Drawing Sheets

U.S. PATENT DOCUMENTS

| | | |
|---|---|---|
| 5,129,742 A | 7/1992 | Tilch et al. |
| 5,132,665 A | 7/1992 | Hutchisson et al. |
| 5,440,184 A | 8/1995 | Samy et al. |
| 5,523,680 A | 6/1996 | Sumi |
| 5,565,769 A | 10/1996 | Mehnert et al. |
| 5,624,192 A | 4/1997 | Rigaux et al. |
| 5,675,203 A | 10/1997 | Schultz et al. |
| 5,731,763 A | 3/1998 | Herweck et al. |
| 5,777,459 A | 7/1998 | Bansal et al. |
| 5,898,388 A | 4/1999 | Hofmann et al. |
| 5,945,908 A | 8/1999 | Nowicki et al. |
| 5,967,669 A | 10/1999 | Ouchi |
| 6,037,766 A | 3/2000 | Goossens et al. |
| 6,084,400 A | 7/2000 | Steinich et al. |
| 6,112,587 A | 9/2000 | Oldenettel |
| 6,157,175 A | 12/2000 | Morinigo et al. |
| 6,161,962 A | 12/2000 | French et al. |
| 6,209,389 B1 | 4/2001 | Sakamoto et al. |
| 6,229,298 B1 | 5/2001 | Sakamoto et al. |
| 6,323,566 B1 * | 11/2001 | Meier ........................ 307/10.2 |
| 6,406,186 B1 | 6/2002 | Torii et al. |
| 6,469,499 B2 | 10/2002 | Delaporte |
| 6,512,366 B2 | 1/2003 | Siess |
| 6,535,135 B1 | 3/2003 | French et al. |
| 6,628,741 B2 | 9/2003 | Netzer |
| 6,721,385 B2 | 4/2004 | Siess et al. |
| 6,771,168 B1 * | 8/2004 | Nguyen ................. 340/426.17 |
| 6,830,379 B2 | 12/2004 | Morita et al. |
| 6,948,856 B2 * | 9/2005 | Takizawa et al. ............ 384/448 |
| 7,444,210 B2 * | 10/2008 | Breed et al. .................... 701/1 |
| 2003/0072405 A1 * | 4/2003 | Siess et al. .................... 377/82 |

FOREIGN PATENT DOCUMENTS

| | | |
|---|---|---|
| EP | 0 594 550 | 4/1994 |
| EP | 0 937 615 A2 | 8/1999 |
| EP | 0 937 615 A3 | 8/1999 |
| EP | 1 177 959 | 2/2002 |
| JP | 10248213 A | 9/1998 |
| WO | WO 98/11356 | 3/1998 |
| WO | WO 00/70779 | 11/2000 |

OTHER PUBLICATIONS

The History of Power Transmission by Radio Waves; Brown, William; 1984; IEEE; pp. 1230-1242.*

U.S. Appl. No 10/382,656, filed Mar. 7, 2003, Toru Takahasi, et al., NTN Corporation Osaka, Japan.

Chinese Office Action for Application No. 031192548 dated Aug. 26, 2005.

* cited by examiner

ROTATION DETECTING DEVICE AND ANTI-SKID BRAKING SYSTEM USING THE SAME

CROSS-REFERENCE TO RELATED APPLICATIONS

This application is a divisional application of U.S. patent application Ser. No. 10/382,656 filed Mar. 7, 2003 now U.S. Pat. No. 7,341,321 and claims the benefits of priority to Japanese patent application no. 2002-064088 filed Mar. 8, 2002, and Japanese patent application no. 2002-064105 filed Mar. 8, 2002 in the Japanese Patent Office, the disclosures of which are incorporated by reference herein.

BACKGROUND OF THE INVENTION

1. Field of the Invention

The present invention relates to a rotation detecting device and an anti-skid braking system utilizing such rotation detecting device.

2. Description of the Prior Art

It is well known that an electric generator is often used as a rotation detecting device used in an anti-skid braking system for automotive vehicles. This type of the electric generator generally includes a rotor mounted on an inner race of a wheel support bearing assembly, that is a rotatable member, and a stator mounted on an outer race of the wheel support bearing assembly that is a non-rotatable member, and is utilized to detect the number of revolutions, i.e., the rotational speed of the rotatable member in terms of the voltage level of an electric voltage signal generated by the electric generator.

It has, however, been found that the system in which the electric voltage signal generated by the electric generator is utilized to detect the rotational speed of the vehicle wheel is incapable of detecting the rotational speed of the vehicle wheel particularly at an extremely low speed rotation of the vehicle wheel at which the rotational speed of the vehicle wheel is barely zero and, hence, the power output from the electric generator is feeble or barely zero.

SUMMARY OF THE INVENTION

Accordingly, the present invention is intended to provide an improved rotation detecting device which is compact in structure and operates on its own electric power generating capability and which can detect the number of revolution of a vehicle wheel even at an extremely low speed, e.g., barely zero speed of rotation of the vehicle wheel, and also an anti-skid braking system utilizing such rotation detecting device In order to accomplish the foregoing object, the present invention in accordance with a first aspect thereof provides a rotation detecting device which includes an electric power generator including a stator and a rotor having a plurality of opposite magnetic poles alternating in a direction circumferentially of the rotor, and at least a first magnetic sensor mounted on either the stator or a support member for supporting the stator and operable to detect the alternating magnetic poles in the rotor. An electric power supply circuit is provided for utilizing an electric power generated by the electric power generator as an electric power source for the at least first magnetic sensor. Where the stator is mounted on an outer race of a bearing assembly, the support member referred to above for supporting the stator may be the outer race of such bearing assembly.

According to this aspect of the present invention, the number of revolutions, that is, the rotational speed can be detected by the magnetic sensor that is different from the electric power generator and the electric power generated by the electric power generator is used as an electric power source for the magnetic sensor. Accordingly, the rotational speed can advantageously detected even at an extremely low speed rotation at which so long as a voltage signal from the electric power generator is utilized for detection of the rotational speed, such rotational speed cannot be detected. Also, since the rotor employed is in the form of a multi-pole magnet, even a slight angle of rotation can be detected. Since this rotor concurrently serves as a magnetic encoder for detection of the rotational speed and also as a device for electric power generation, the rotation detecting device can be assembled compact in structure with a minimized number of component parts even though the electric power generator and the magnetic sensor are provided separately.

In the present invention, two magnetic sensors may be employed in the rotation detecting device, and the first and second magnetic sensors may be disposed so as to align with respective positions displaced 90° in phase of the cycle of alternating repetition of the opposite magnetic poles in the rotor. In such case, the use of the two magnetic sensors enables the rotation detecting device to detect not only the rotational speed, but also the direction of rotation based on the detection signals outputted from those magnetic sensors.

The stator referred to above may be of a structure including a ring member made of a magnetic material and a coil accommodated in the ring member. This ring member has two sets of a plurality of pawls provided at a portion of the ring member that confronts the rotor. The pawls of the two sets extend in respective directions opposite to each other so as to interleaved relative to each other while alternating one after another in a direction circumferentially of the ring member, the neighboring pawls being spaced in the circumferential direction with a gap defined therebetween. With the generator stator employing the ring member that is made of a magnetic material and accommodate the coil, the electric power can be efficiently generated by the electric power generator of a compact structure. Also, the efficiency of the electric power generation can further be enhanced where the pawls of the two sets in the ring member are arranged so as to alternate one after another in the circumferential direction of the ring member.

The ring member referred to above may preferably have a sensor window defined in a portion the circumference of the ring member for accommodating the first magnetic sensor. This sensor window can be defined by depleting some of the pawls in the ring member. This is particularly advantageous in that the magnetic sensor can find a place for disposition thereof where it will not be magnetically affected by the ring member made of the magnetic material, for facilitation of detection of the magnetic poles on the rotor.

Also, in one preferred embodiment, the rotation detecting device may further include a transmitting device for wireless transmitting a sensor output signal from the magnetic sensor, in which case the electric power supply circuit can utilize the electric power generated by the electric power generator also as an electric power source for the transmitting device. In such design, as an electric power source for the transmitting device, no extra and separate electric power source is needed and, therefore, the rotation detecting device can be manufactured compact in size.

The electric power supply circuit referred to above may preferably include an electric component part selected from the group consisting of an electric double layer capacitor, a secondary cell and a primary cell. Any of the electric double layer capacitor, the secondary cell and the primary cell when used in the electric power supply circuit forms an electric power accumulator and, therefore, even when the rotor is halted for a prolonged length of time, detection of the rotational speed can be resumed assuredly and quickly.

One preferred embodiment of the present invention may include a wireless switching device for selectively switching on or off a supply of an electric power from the electric power supply circuit. This wireless switching device includes a tuning circuit for detecting a radio wave of a particular frequency and a semiconductor switching element interposed in the electric power supply circuit and capable of being selectively turned on or off in response to a detection signal of the radio wave detected by the tuning circuit. The wireless switching device in its entirety can be powered by an electric power of the detection signal of the radio wave detected by the tuning circuit. The use of the wireless switching device for the electric power supply circuit makes it possible to interrupt the supply of the electric power from the electric power supply circuit to the magnetic sensor and the transmitting device in such a way that in the event that rotation of the rotor is halted for a prolonged length of time, transmission of a radio wave for switching can be interrupted or can be done and that the semiconductor switching element can be switched off. This is particularly advantageous in that any undesirable waste of the electric power can be suppressed and in that in the event of restart of the rotation of the rotor, transmission of the radio wave for switching can be resumed to switch the semiconductor switching element on to enable the rotation to be again detected. The wireless switching device utilizes the detection signal of the radio wave as an electric power source for electrically powering such wireless switching device and, therefore, no extra and independent electric power source is needed, resulting in no problem associated with an undesirable waste of the electric power.

The present invention in accordance with a second aspect thereof also provides a bearing assembly equipped with a rotation detecting device, which includes a non-rotatable member, a rotatable member and a plurality of rolling elements interposed between the non-rotatable member and the rotatable member to permit the latter to rotate relative to the former, and a rotation detecting device of the structure as discussed hereinabove. In this bearing assembly, the stator is mounted fixedly on the non-rotatable member and the rotor is mounted on the rotatable member for rotation together therewith.

According to the second aspect of the present invention, assuming that the rotatable member rotates, the magnetic sensor detects change in polarity of the rotor then rotating together with the rotor to thereby detect the rotational speed of the rotatable member. Also, the utilization of the electric double layer capacitor, the secondary cell or the primary cell, in which the electric power generated by the electric power generator is charged or accumulated, as an electric power source for magnetic sensor makes it possible for the rotational speed to be detected even at an extremely low speed rotation.

The present invention in accordance with a third aspect thereof also provides a wheel support bearing assembly for rotatably supporting a wheel relative to a vehicle body structure, said wheel support bearing assembly includes an outer member having a plurality of outer raceways defined in an inner periphery thereof, an inner member having a corresponding number of inner raceways defined in an outer periphery thereof in alignment with the outer raceways, a plurality of rolling elements interposed between the outer and inner members and rollingly accommodated in part within one of the outer raceways and in part within a mating one of the inner raceways to permit one of the outer and inner members to rotate relative to the other of the outer and inner members. This wheel support bearing assembly makes use of a rotation detecting device of the structure as discussed hereinabove in connection with the first aspects of the present invention. Even in this wheel support bearing assembly, the stator is mounted fixedly on one of the outer and inner members and the rotor is mounted on the other of the outer and inner members.

Considering that the wheel support bearing assembly in general is used in a severe environment in which it is exposed to, for example, a road surface, electric lines when wired in the wheel support bearing assembly are susceptible to breakage. However, utilization of the rotation detecting device of the present invention in the wheel support bearing assembly can eliminate the use of such electric lines and, therefore, a highly reliable control can be achieved with no line breakage being accompanied. Also, the effect of detecting the rotational speed while the rotation detecting device is electrically powered by its self-generating capability can be effectively utilized in an anti-skid braking system. In particular since the rotational speed can be detected even at an extremely low speed rotation, a highly reliable control can also be achieved.

Furthermore, the present invention in accordance with a fourth aspect thereof provides an anti-skid braking system for controlling a braking force to be applied to a wheel brake in dependence on a detection signal detected as indicative of the number of revolution of a wheel. This anti-skid braking system includes a rotation detecting device being of the structure discussed in connection with the first aspect of the present invention. This rotation detecting device is operable to output the detection signal and includes a rotor fixedly mounted on a rotatable member rotatable together with the wheel, and a stator mounted fixedly on a wheel support member for supporting the rotatable member. The anti-skid braking system also includes a control circuit mounted on the vehicle body structure for controlling the braking force, and a communicating unit for wireless transmitting the detection signal outputted from the rotation detecting device, said unit including a transmitting device and a receiving device, which are mounted on the wheel support member and a vehicle body structure, respectively.

According to the fourth aspect of the present invention, the rotational speed can be detected even at an extremely low speed rotation and a highly reliable control can also be achieved. Also, since the rotation detecting device used in the anti-skid braking system has not only a capability of electric power generation, but also a capability of wireless transmission, no electric and signal lines need be employed between the wheel support bearing assembly and the vehicle body structure and, therefore, a highly reliable control can advantageously be accomplished with no line breakage.

In the anti-skid braking system of the structure discussed above, the electric power supply circuit may preferably be of a design that utilizes the electric power generated by the electric power generator, as an electric power source for the transmitting device. The utilization of the electric power generated by the electric power generator as an electric power source not only for the magnetic sensor, but also for the transmitting device substantially eliminates the need to use electric wiring between the wheel support bearing assembly and the vehicle body structure and, therefore, not only can the reliability be secured, but the handling of the wheel support bearing assembly can also be facilitated.

In accordance with a fifth aspect of the present invention, there is provided a rotation detecting device which includes a rotation detector having a capability of detecting the rotational speed and including an electric power generator having a rotor and a stator, a transmitting device for wireless transmitting a rotation signal indicative of the rotational speed detected by the rotation detector, an electric power supply circuit for utilizing an electric power generated by the electric power generator for electrically powering the transmitting device, and a wireless switching device for selectively switching on or off supply of an electric power from the electric power supply circuit. The wireless switching device referred to above includes a tuning circuit for detecting a radio wave of a particular frequency and a semiconductor switching element interposed in the electric power supply circuit and capable of being selectively turned on or off in response to a detection signal of the radio wave detected by the tuning circuit. This wireless switching device in its entirety is electrically powered by an electric power of the detection signal of the radio wave detected by the tuning circuit.

According to the fifth aspect of the present invention, during rotation of the rotor, the rotation detecting device performs detection of the rotational speed and the rotation signal outputted from the rotation detecting device and indicative of the rotational speed so detected is transmitted wireless by the transmitting device. Both of the transmitting device and the rotation detecting device are electrically powered by the electric power generated by the electric power generator. For this reason, no external electric line for the supply of the electric power and also for transmission of the signal is needed.

When the rotor is halted for a prolonged length of time, the electric power generator cease generation of an electric power and the electric power accumulated in an accumulating device included in the electric power supply circuit is discharged to result in an eventual failure to supply an electric power to the transmitting device and others. However, the wireless switching device interposed in the electric power supply circuit is effective to switch the electric power source off to thereby suppress the discharge of the electric power accumulated in the accumulating device and, therefore, when the rotation is F resumed after the rotation had been halted for the prolonged length of time, detection of the rotational speed and wireless transmission of the detection signal can be reinitiated. The wireless switching device makes use of, as its electric power source, the electric power of the detection signal of the radio wave obtained from the tuning circuit and, therefore, it can be operated with no electric power source without accompanying a problem associated with waste of the electric power.

The rotation detecting device of the structure discussed above may preferably include a rectifier circuit for rectifying an output from the tuning circuit and a surface acoustic wave filter interposed between the tuning circuit and the rectifier circuit. Utilization of the surface acoustic wave filter is effective to increase the selectivity of the particular frequency and any malfunction resulting from interference with an external radio waves can be prevented advantageously.

The electric power supply circuit employed in the rotation detecting device according to the fifth aspect of the present invention may preferably include an electric component part selected from the group consisting an electric double layer capacitor, a secondary cell and a primary cell for compensating a reduction of the electric power generated by the electric power generator at a low speed rotation of the rotor. Where the electric double layer capacitor is employed, the electric power is accumulated in a compact structure. Where the secondary cell is employed, the amount of the electric power accumulated therein can advantageously be increased. This secondary cell can be charged with the electric power generated by the electric power generator. Although the primary cell cannot be charged, any possible unwanted waste of the electric power can be suppressed by the wireless switching device and, therefore, the use of the primary cell will not pose any problem in that it can be used for a prolonged length of time.

The rotation detector referred to above may be of a type in which a voltage signal generated is utilized to perform detection of the rotational speed and may preferably include a sensor utilizing the electric power generator as an electric power source therefor, to detect the rotational speed. Where the voltage signal generated is utilized to perform detection of the rotational speed, the structure can advantageously be simplified. On the other hand, where the sensor is separately utilized in the rotation detector, detection of the rotational speed is possible even at such an extremely low speed rotation as to render detection of the rotational speed to be impossible with the voltage signal generated by the electric power generator. Even in such case, the electric power generated by the electric power generator can be used as an electric power source for the sensor and no extra electric power source device is therefore needed.

In the rotation detecting device of the structure according to the fifth aspect of the present invention, the rotor and the stator of the electric power generator may be mounted on a rotatable member and a non-rotatable member of a wheel support bearing assembly and the signal transmitted wireless by the wireless transmitting device and indicative of the rotational speed is preferably used for controlling an automobile anti-skid braking system.

In the case of the anti-skid braking system employed in an automobile, the rotation detecting device generally tends to be installed in a severe environment such as, for example, inside a wheel support bearing assembly that is exposed to a road surface and, accordingly, one or some of the electric lines if any are susceptible to breakage when being collided with stones or rocks. For this reason, the present invention makes use of the wireless rotation detecting device having a self-generating capability and a wireless transmitting capability and, accordingly, the need to use the electric lines otherwise required can advantageously be eliminated and, also, any undesirable waste of the electric power which would otherwise result from self-discharge can advantageously be suppressed. Accordingly, with the rotation detecting device of the present invention, the signal indicative of the rotational speed can be transmitted wireless even after a prolonged length of time during which rotation is halted.

In accordance with a sixth aspect of the present invention, a wireless switching device is provided, which includes a tuning circuit for detecting a radio wave of a particular frequency, and a semiconductor switching element interposed in the electric power supply circuit and capable of being selectively turned on or off in response to a detection signal of the radio wave detected by the tuning circuit. This wireless switching device in its entirety is electrically powered by an electric power of a detection signal of the radio wave detected by the tuning circuit.

With this wireless switching device, the semiconductor switching element can be selectively switched on or off by means of a radio wave transmitted from outside of the wireless switching device with no need to use any dedicated electric power source and, accordingly, the structure can advantageously be simplified. Because of this, the wireless switching device can effectively utilized in selectively switching on or off an electric power source for, for example, a wireless transmitting device provided with an electric power generator.

The present invention in accordance with a seventh aspect thereof provides a wheel support bearing assembly for rotatably supporting a wheel relative to a vehicle body structure, which bearing assembly includes an outer member having a plurality of outer raceways defined in an inner periphery thereof, an inner member having a corresponding number of inner raceways defined in an outer periphery thereof in alignment with the outer raceways, a plurality of rolling elements interposed between the outer and inner members and rollingly accommodated in part within one of the outer raceways and in part within a mating one of the inner raceways to permit one of the outer and inner members to rotate relative to the other of the outer and inner members. The wheel support bearing assembly also includes a wireless rotation detecting device of the structure discussed in connection with the fifth aspect of the present invention. Specifically, the wireless rotation detecting device is of the structure in which the stator is mounted fixedly on one of the outer and inner members and the rotor is mounted on the other of the outer and inner members.

According to this aspect of the present invention, the wheel support bearing assembly can have a capability of detecting the rotational speed and can contribute to reduction in weight and manufacturing cost of the automobile with no risk of the otherwise employed electric lines.

The present invention in accordance with an eighth aspect thereof provides an anti-skid braking system for controlling a braking force to be applied to a wheel brake in dependence on a detection signal detected as indicative of the number of revolution of a wheel, which system includes a rotation detecting device including a rotor mounted fixedly on a rotatable member rotatable together with the wheel, and a stator mounted fixedly on a wheel support member for supporting the rotatable member, and a control circuit mounted on the vehicle body structure for controlling the braking force. The rotation detecting device referred to above is of the structure discussed in connection with the fifth aspect of the present invention and includes the transmitting device and a receiving device to receive the rotation signal from the transmitting device, which are mounted on the wheel support member and a vehicle body structure, respectively.

According to this aspect of the present invention, the use of any electric lines otherwise required to connect between the wheel support member and the vehicle body for transmission of the sensor signal can advantageously be dispensed with and, hence, no otherwise complicated wiring work is required, resulting in reduction in weight and manufacturing cost of the automobile. Also, since the electric power supply circuit can be controlled, i.e., selectively switched on or off by means of the wireless switching device, while the rotation detecting device can be electrically powered with the electric power generated as a result of rotation of the vehicle wheel, any undesirable waste of the electric power can advantageously be suppressed and, also, even at the time of acceleration of the automobile subsequent to the prolonged length of time during which the rotation has been halted, information on initial rotation can be obtained to allow a control at the initial stage of acceleration to be accomplished.

In the anti-skid braking system according to the eighth aspect of the present invention, a continuously halted status detector may be mounted on a mechanism that differs depending on whether an automobile is in a continuously halted status or in a running status, in combination with a switch-off signal transmitting device operable in response to a detection output signal from the continuously halted status detector for transmitting a wireless signal capable of being detected by the tuning circuit of the wireless switching device.

The provision of the switch-off signal transmitting device that can be activated in response to the detection output signal from the continuously halted status detector is effective in that in the event of a continued halted condition the supply of the electric power from the electric power supply circuit in the rotation detecting device can be switched off without requiring any human intervention, to thereby suppress any undesirable waste of the electric power. The switch-off signal may be a signal in which continuous output of a transmitted signal is rendered to be off. In other words, for example, the switch-off signal transmitting device can continue transmission of a signal required to switch the wireless switching device on, during the absence of the detection signal from the continuously halted status detector, but to switch off such signal required to switch the wireless switching device on, during the presence of the detection signal from the continuously halted status detector.

The continuously halted status detector referred to above may be of a type capable of detecting at least one of continuously halted statuses of the automobile including a condition in which a parking brake is held in a locked position, a condition in which an engine is inactivated, a condition in which an ignition key is removed from an ignition switch, a condition in which a transmission is set to a parking position.

Any of the conditions in which a parking brake is held in a locked position, in which an engine is inactivated, in which an ignition key is removed from an ignition switch and in which a transmission is set to a parking position, is generally accompanied by a stop that last for a prolonged length of time longer than a predetermined value. Also, in modern automobiles now available, a detecting device for detecting any of those conditions is employed for synthesization of signals for indication to a driver. Accordingly, utilization of this detecting device for detecting any of those conditions as a device for activating the continuously halted status detector is effective to control, i.e., selectively switch on or off the wireless switching device by detection of at least one of the continuously halted statuses of the automobile advantageously with no need to any extra, dedicated sensor.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
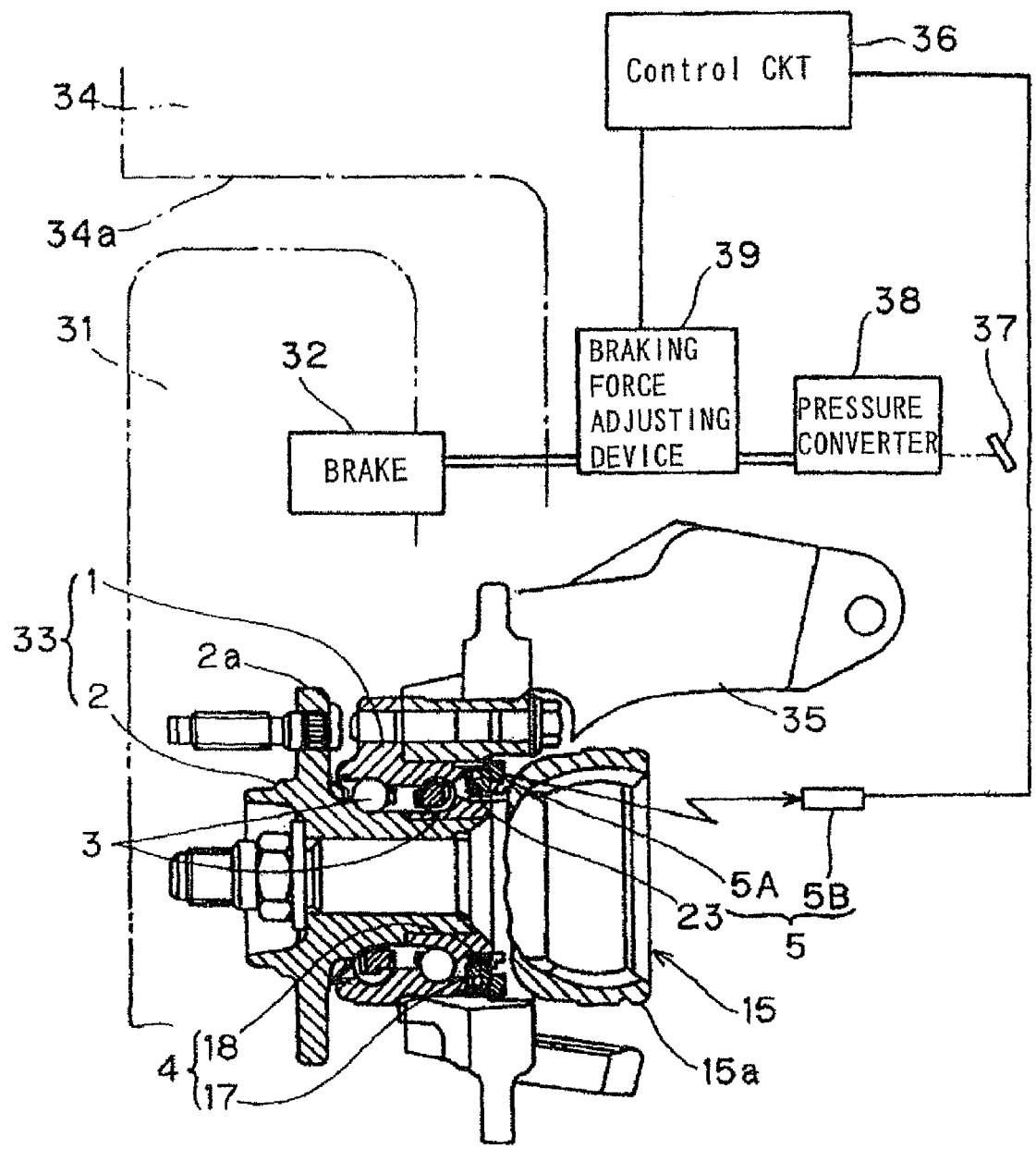
FIG. 1 is a longitudinal sectional view of a wheel support bearing assembly incorporating a rotation detecting device, which is shown in combination with an anti-skid braking system according to a first preferred embodiment of the present invention.

Hereinafter, preferred embodiments of the present invention will be described with reference to the accompanying drawings. FIG. 1 illustrates a conception of the structure of an anti-skid braking system utilizing a rotation detecting device according to a first preferred embodiment of the present invention. The anti-skid braking system shown therein is of a design operable to detect the rotational speed of a vehicle wheel 31 to provide a detection signal which is subsequently utilized to control a braking force applied by an vehicle brake 32. The vehicle wheel 31 is rotatably supported by a vehicle body structure 34, for example, a chassis through a wheel support bearing assembly 33. This wheel support bearing assembly 33 includes an outer member 1 serving as a non-rotatable member, an inner member 2 serving as a rotatable member, and a plurality of, for example, two, circular rows of rolling elements 3 rollingly interposed between the outer and inner members 1 and 2 to permit the inner member 2 to rotate relative to the outer member 1. The outer member 1 is rigidly coupled through a knuckle 35 to a suspension (not shown) that extends downwardly from the vehicle body structure 34. The outer member 1 and the knuckle 35 altogether defines a wheel support member for supporting the inner member 2 serving as the rotatable member. The inner member 2 may be of a generally cylindrical configuration having one end formed with a wheel mounting flange 2a protruding radially outwardly therefrom, and the vehicle wheel 31 is secured to this wheel mounting flange 2a for rotation together therewith. The vehicle wheel 31 so far shown therein is a steering wheel.

The inner member 2 of the wheel support bearing assembly 33 has the opposite end coupled with an axle (not shown) through a constant velocity joint 15 for rotation together therewith.

The inner member 2 has a generator rotor 18 fixedly mounted thereon, and the outer member 1 has a generator stator 17 rigidly mounted thereon in alignment with the rotor 18 on the inner member 2. The rotor 18 and the stator 17 form respective parts of an electric power generator 4. The rotor 18 is in the form of an annular multi-pole magnet having a plurality of opposite magnetic poles N and S alternating in a direction circumferentially thereof. The stator 17 carried a magnetic sensor 23 (See FIG. 3) for detecting cyclic passage of the alternating magnetic poles N and S of the rotor 18 during rotation of the rotor 18 together with the inner member 2, and an electric power supply circuit 24 (See FIG. 7) that utilizes an electric power generated by the electric power generator 4 as an electric power source for the magnetic sensor 23. A detection signal generated by the magnetic sensor 23 indicative of the cycle of passage of the alternating magnetic poles N and S past the magnetic sensor 23 is transmitted wireless to a control circuit 36 by a wireless communicating unit 5. The control circuit 36 referred to previously is a device for controlling a braking force to be applied to the vehicle brake 32. The wireless communicating unit 5 includes a transmitting device 5A mounted fixedly on the outer member 1, and a receiving device 5B fixedly mounted on the vehicle body structure 34. The receiving device 5B may be disposed inside, for example, a tire housing 34a rigid with the vehicle body structure 34.

The vehicle brake 32 is of a design including a friction member (not shown) such as, for example, a brake drum or disc fixedly mounted on the vehicle wheel 31 and a brake pad (not shown) engageable frictionally with the friction member to apply the braking force to the vehicle wheel 31, and includes a hydraulic cylinder to actuating the brake pad. This vehicle brake 32 is controlled by a brake operating member 37 such as a foot pedal 37 linked with a pressure converter 38 for converting a pedaled depression of the brake operating member 37 into a fluid pressure, either hydraulic or pneumatic, that is subsequently applied to the vehicle brake 32 in a manner well known to those skilled in the art.

The braking force adjusting device 39 referred to above serves as a device for adjusting the braking force to be applied to the vehicle brake 32 in response to an adjusting command that is applied from the control circuit 36. This braking force adjusting device 39 is disposed on a hydraulic circuit extending between the vehicle brake 32 and the pressure converter 38.

The control circuit 36 serves as a device for applying the adjustment command to the braking force adjusting device 36 for adjusting the braking force to be applied to the vehicle wheel 31 in dependence on the rotational speed of the vehicle wheel 31 detected by the magnetic sensor 23. This control circuit 36 is constructed of an electronic circuit utilizing, for example, a microcomputer or the like.

Figure 2:
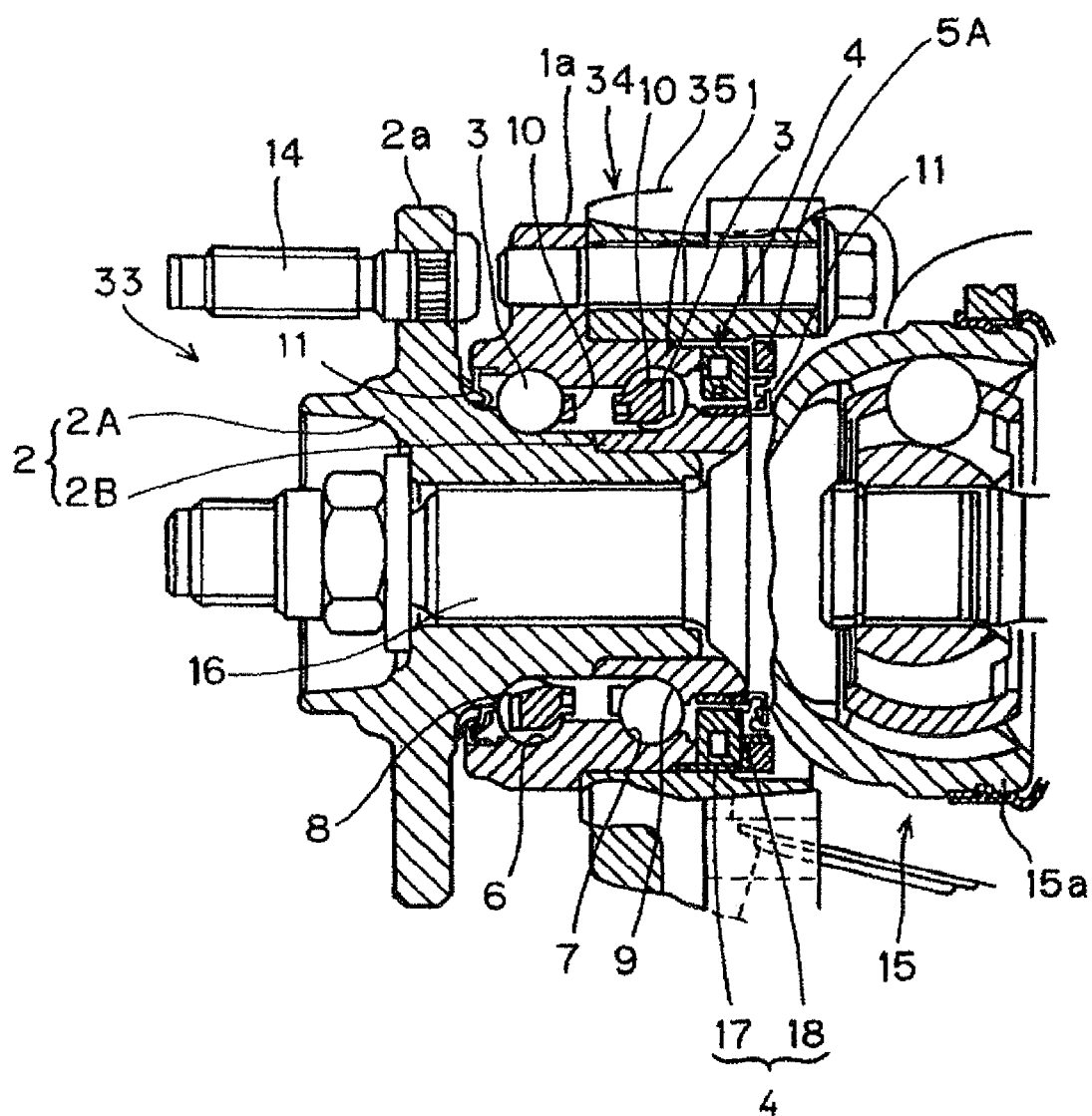
FIG. 2 is a longitudinal sectional view, on an enlarged scale, of the wheel support bearing assembly of FIG. 1, shown together with an electric power generator and a wireless communicating unit.

The details of the various component parts will now be described. As shown in FIG. 2, the wheel support bearing assembly 33 is of a design in which the circular rows of the rolling elements 3 are rollingly interposed between the outer and inner members 1 and 2 that are positioned radially outwardly and inwardly, respectively, relative to each other so as to define an annular space therebetween. The electric generator 4 is accommodated within the annular space at one end thereof adjacent the constant velocity joint 15.

The outer member 1 has an inner peripheral surface formed with circumferentially extending outer raceways 6 and 7 axially spaced apart from each other and, correspondingly, the inner member 2 has an outer peripheral surface formed with similarly circumferentially extending inner raceways 8 and 9 positioned in alignment with the outer raceways 6 and 7, respectively. The respective circular rows of the rolling elements 3 are seated in part within the outer raceways 6 and 7 and in part within the inner raceways 8 and 9. The wheel support bearing assembly 33 of the structure so far shown is a double-row angular contact ball bearing, wherein the raceways 6 to 9 have their respective contact angles so defined as to achieve a back-to-back alignment. The rolling elements 3 of each circular row are rollingly retained by a respective retainer or cage. Opposite open ends of the annular space delimited between the outer and inner members 1 and 2 are tightly sealed by respective sealing members 11.

The outer member 1 has one end formed with a radially outwardly extending vehicle body fitting flange 1a to which the wheel suspension (not shown) rigid with the vehicle body structure 34 is coupled through the knuckle 35. It is to be noted that the outer member 1 is of one-piece structure including the vehicle body fitting flange 1a. On the other hand, the inner member 2 has a wheel mounting flange 2a protruding radially outwardly therefrom, to which mounting flange 2a is bolted the wheel 31 by means of a plurality of bolts 14.

The inner member 2 includes a hub wheel 2A formed integrally with the wheel mounting flange 2a and another inner race forming member 2B combined with the hub wheel 2A to define the inner member 2. The inner raceways 8 and 9 are formed on the hub wheel 2A and the inner race forming member 2B, respectively. The inner race forming member 2B is in the form of a generally hollow cylinder having a bore defined therein, and an axle 16 integral with a generally cup-shaped outer race 15a of the constant velocity joint 15 is inserted into the bore of the inner member 2 for rotation together therewith.

Figure 4A:
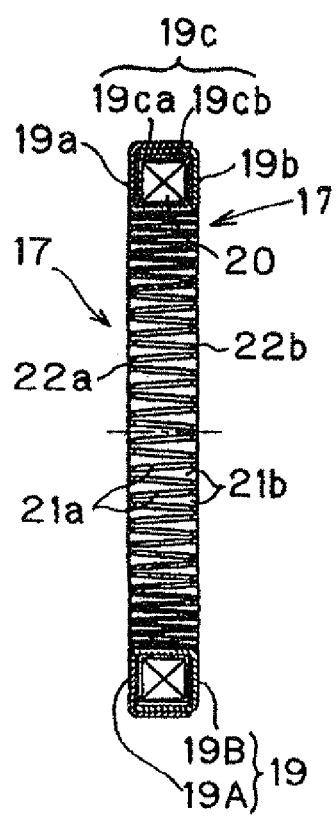
FIGS. 4A and 4B are longitudinal sectional and front elevational views, respectively, showing a stator of the electric power generator.
Figure 4B:
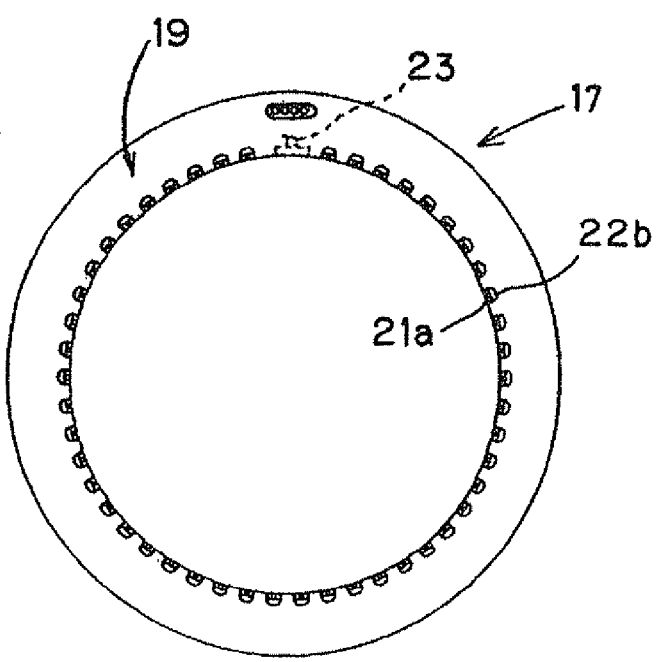
Figure 4C:
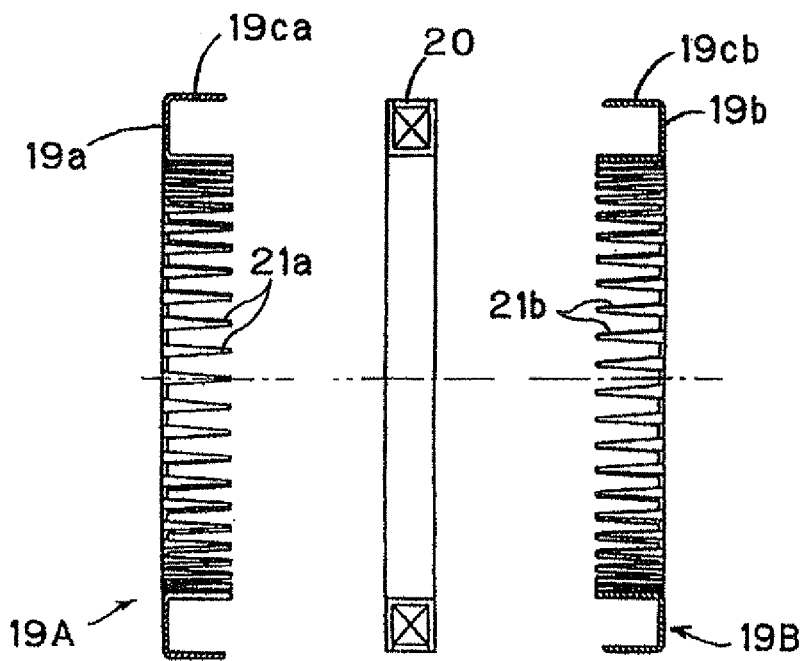
FIG. 4C is an exploded view of the stator of the electric power generator shown in FIGS. 4A and 4B.

FIGS. 4A to 4C illustrates the stator 17 of the electric power generator 4. As shown therein, the stator 17 is of a design in which a plurality of magnetic poles made up of pawls 21a and 21b of a pole shape are arranged alternately and constitutes a part of a claw pole type electric power generator 4.

More specifically, the stator 17 includes a generally tubular ring member 19 made of a magnetic material and a coil 20 accommodated within the ring member 19. The ring member 19 has a generally box-like sectional shape and is made up of first and second ring forming segments 19A and 19B. Each of the first and second ring forming segments 19A and 19B includes an annular end wall 19a or 19b and a radially outer wall 19ca or 19cb formed integrally with a radially outer edge of the corresponding ring forming segment 19A or 19B so as to extend axially at right angles to the latter. So far shown, the second ring forming segment 19B is slightly undersized relative to the first ring forming segment 19A so that the first ring forming segment 19A can be capped onto the second ring forming segment 19B to thereby complete the generally tubular ring member 19. It is to be noted that mounting of the first ring forming segment 19A onto the second ring forming segment 19B should be so tight that the resultant ring member 19 eventually forming a yoke can have an internal magnetic circuit of a minimized magnetic resistance, with the radially outer walls 19ca and 19cb of the first and second ring forming segments 19A and 19B held in tight contact with each other to define an outer peripheral wall 19c of the ring member 19. An inner peripheral wall of the ring member 19 opposed to the outer peripheral wall 19c of the ring member 19 is defined by a plurality of pawls 21a integral with the first ring forming segment 19A and a corresponding number of pawls 21b integral with the second ring forming segment 19B, which pawls 21a and 21b are interleaved together when the first and second ring forming members 19A and 19B are mated together to define the ring member 19.

The pawls 21a integral with the first ring forming segment 19A are in a generally comb-shaped arrangement and are formed by axially inwardly bending radially outwardly tapering prongs integral with a radially inner edge of the annular end wall 19a so as to extend substantially parallel to the radially outer wall 19ca to thereby complete the respective pawls 21a. Similarly, the pawls 21b integral with the second ring forming segment 19B are in a generally comb-shaped arrangement and are formed by axially inwardly bending radially outwardly tapering prongs integral with a radially inner edge of the annular end wall 19b so as to extend substantially parallel to the radially outer wall 19cb to thereby complete the respective paws 21b. Each of the pawls 21a and 21b is of a shape having a width progressively decreasing in a direction away from the corresponding annular end wall 19a or 19b. In an assembled condition in which the first and second ring forming segments 19A and 19B are mated together as best shown in FIG. 4A, the pawls 21a of the first ring forming segment 19A and the pawls 21b of the second ring forming segment 19B are interleaved with each other with the neighboring pawls 21a and 21b spaced a predetermined distance from each other in a direction circumferentially of the resultant ring member 19. As such, the first ring forming segment 19A has generally V-shaped cutouts 22a each defined between the neighboring pawls 21a and, similarly, the second ring forming segment 19B has generally V-shaped cutouts 22b each defined between the neighboring pawls 21b and, accordingly, in the assembled condition of the ring member 19, respective tips of the pawls 21a are positioned adjacent corresponding bottoms of the cutouts 22b in the second ring forming segment 19B and respective tips of the pawls 21b are positioned adjacent corresponding bottoms of the cutouts 22a in the first ring forming segment 19A.

This ring member 19 of the structure described above can be prepared from a metal plate of a magnetic material such as, for example, stainless plate or silicon steel plate by the use of a press work.

Figure 3A:
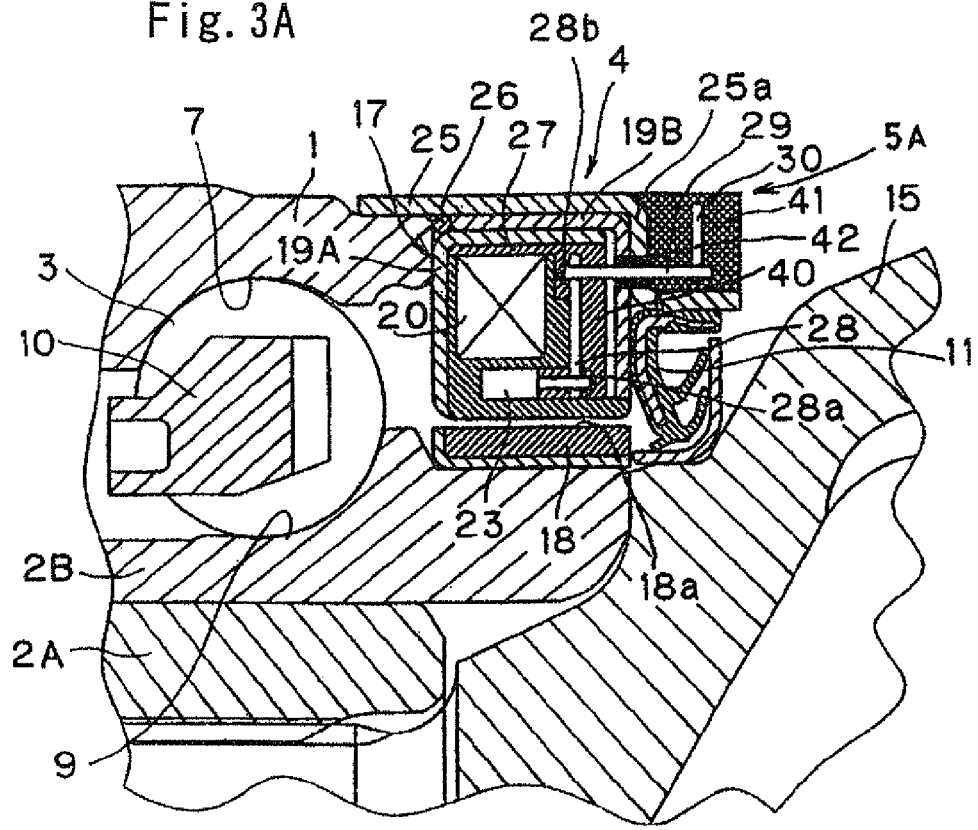
FIG. 3A is a fragmentary longitudinal sectional view, on an enlarged scale, showing the details of a portion of the electric power generator where a magnetic sensor is disposed.
Figure 3B:
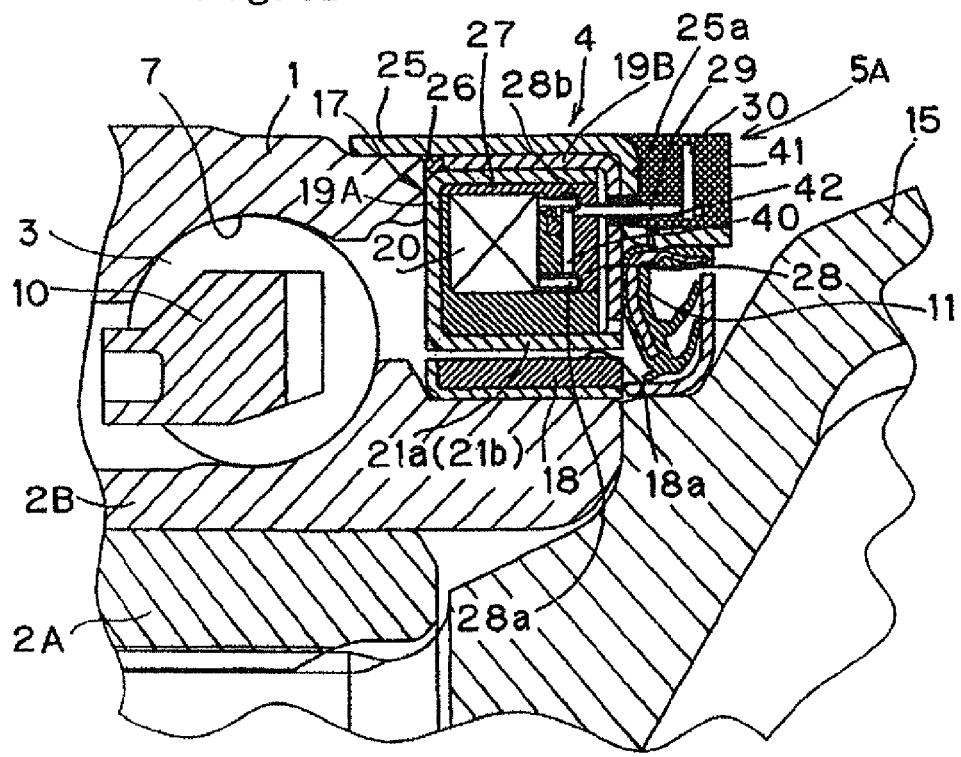
FIG. 3B is a view similar to FIG. 3A, on an enlarged scale, showing the details of another portion of the electric power generator where no magnetic sensor is disposed.

FIGS. 3A and 3B illustrates the manner in which the electric power generator 4 is installed. Specifically, FIG. 3A illustrates, in a fragmentary longitudinal sectional view, a portion of the wheel support bearing assembly 33 where the magnetic sensor 23 is disposed whereas FIG. 3B illustrates, in a similar view, a different portion of the wheel support bearing assembly 33 than that portion where the magnetic sensor 23 is disposed. The stator 17 of the structure described previously in detail is fixedly mounted on the outer member 1 through a ring-shaped support member 25. In other words, the stator 17 is inserted, preferably press-fitted inside the ring-shaped support member 25 which is in turn fixedly mounted on, e.g., tightly capped onto the outer member 1. In this condition, the stator 17 has its one end held in abutment with an annular free end face of the outer member 1 and is hence positioned immovable axially. An O-ring 26 is interposed between the annular free end face of the outer member 1 and one end face of the stator 17 and is, when the stator 17 is held in abutment with the outer member 1 in the manner described above, compressed axially inwardly to expand radially outwardly, thereby providing a tight seal by which no external fluid medium will not enter from outside. It is to be noted that, in place of the O-ring 26, an elastic member may be provided on an inner periphery of the ring-shaped support member 25 and/or an outer periphery of the stator 17.

The rotor 18 is fixedly mounted on an outer periphery of the inner member 2. The stator 17 and the rotor 18 are so positioned relative to each other that the pawls 21a and 21b can confront an annular magnetized surface 18a of the rotor 18. The ring member 19 comprised of the first and second ring-forming segments 19A and 19B and serving as the yoke of the stator 17 has an elastic member 27 such as, for example, an elastic bonding material disposed or otherwise filled therein to provide an electric insulation and a relative damping effect between the ring member 19 and the coil 20 accommodated within the stator 17.

Figure 5A:
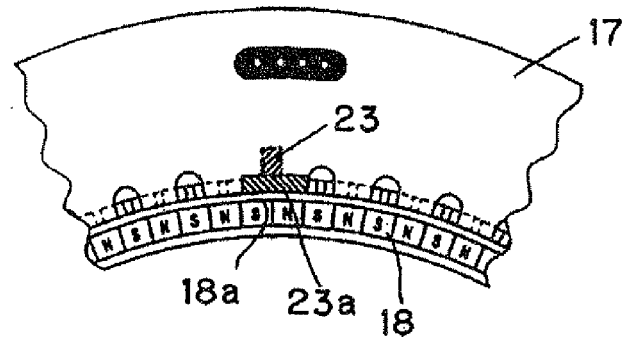
FIG. 5A is a fragmentary view, on an enlarged scale, of the electric power generator as viewed from a direction conforming to an axial direction of such generator.
Figure 5B:
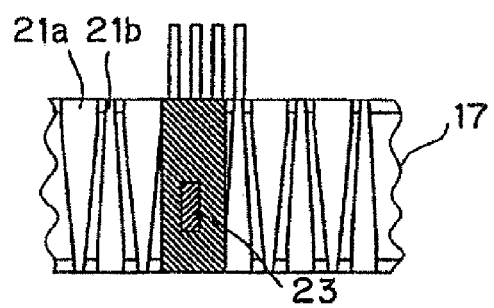
FIG. 5B is a fragmentary view, on an enlarged scale, of the electric power generator of FIG. 5A as viewed in a direction radially outwardly of the stator of the electric power generator.

The magnetic sensor 23 referred to previously is disposed within the stator 17 and at a location radially inwardly of the coil 20 inside the ring member 19. This magnetic sensor 23 has a sensing surface 23a (as best shown in FIG. 5A) that cooperates with the magnetized surface 18a of the rotor 18. In order to allow the sensing surface 23a of the magnetic sensor 13 to be exposed bare to the magnetized surface 18a of the rotor 18, some of the alternating pawls 21a and 21b of the ring member 19 in the stator 17 are depleted to define a sensing window in the stator 17. FIG. 5A illustrates this sensing window in the stator 17 as viewed from a direction conforming to the axial direction of the wheel support bearing assembly 33, whereas FIG. 5B illustrates the sensing window as viewed from the radially outward direction. As clearly shown in FIGS. 5A and 5B, in order to allow the sensing surface 23a of the magnetic sensor 23 to be exposed bare to the magnetized surface 18a of the rotor 18, some of the alternating pawls 21a and 21b, for example, one of the pawls 21a and one of the pawls 21b next to such one of the pawls 21a, are depleted to define the sensing window.

Lead wires extending respectively from the magnetic sensor 23 and the coil 20 are soldered to an electric circuit substrate 28 disposed inside the stator 17 and are electrically connected with a detecting and transmitting circuit 30, as will be described later, through terminal pins 29 rigid on the electric circuit substrate 28. In order to avoid an electric contact failure at soldered connections 28a and 28b on a surface of the electric circuit substrate 28 which would otherwise occur under the influence of vibrations and/or shocks, that surface of the electric circuit substrate 28 is covered by a molding 40 of a resin material or the like. The terminal pins 29 are in turn soldered to, or otherwise connected through a connector with the detecting and transmitting circuit 30.

The detecting and transmitting circuit 30 is fixedly mounted on an outer periphery of a generally L-sectioned flange 25a that is integrally formed with an axially free end of the ring-shaped support member 25 mounted on the outer periphery of the outer member 1 and a portion of the detecting and transmitting circuit 30 adjacent that outer periphery of the L-sectioned flange 25a is covered by a molding 41 of a resin material or the like. A pin insert hole 42 defined so as to extend therethrough from the ring member 19 to the flange 25a of the ring-shaped support member 25 is sealed by a molding of a resin material or the like or, alternatively or in addition thereto, sealed by an elastic material wound around the terminal pins 29.

Figure 7:
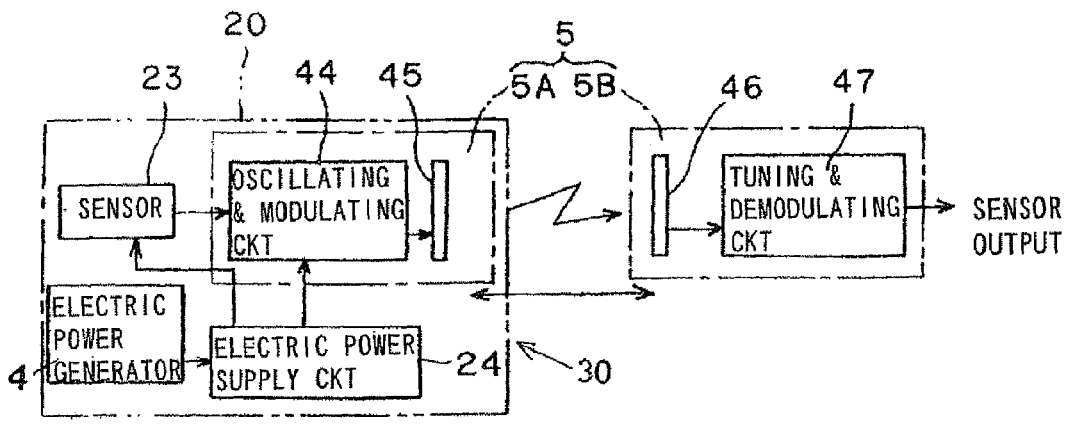
FIG. 7 is a block diagram showing a wireless communicating unit employed in the electric power generator.

The detecting and transmitting circuit 30 includes, as best shown in FIG. 7, an electric power supply circuit 24 which utilizes an electric power generated by the electric power generator 4 as an electric power source for the magnetic sensor 23, and a transmitting device 5A for transmitting wireless a detection signal outputted from the magnetic sensor 23. The transmitting device 5a in turn includes an oscillating and modulating circuit 44 and a transmission antenna 45. The receiving device 5B of the wireless communicating unit 5 includes a receiver antenna 46 and a tuning and demodulating circuit 47 for tuning and demodulating the detection signal, received by the receiver antenna 46. It is to be noted that the use of the magnetic sensor 23 can be dispensed with if the detecting and transmitting circuit 30 is of a design capable of transmitting an electric voltage, generated by the electric power generator 4, as a detection signal indicative of the rotational speed of the vehicle wheel.

Figure 8:
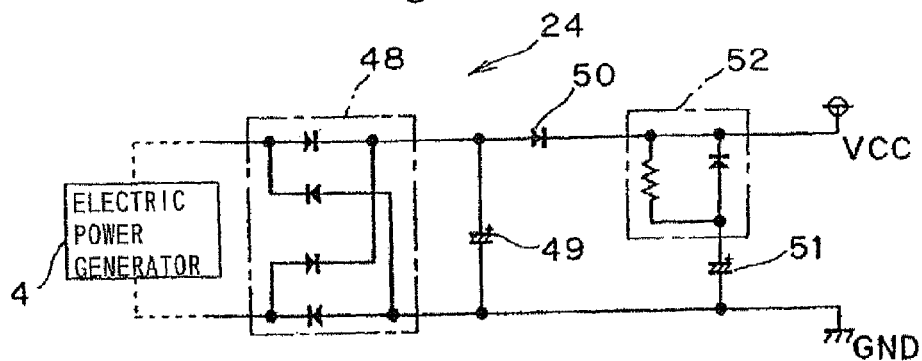
FIG. 8 is a circuit diagram showing an example of an electric power supply circuit employed in an external circuit of the stator of the electric power generator.
Figure 9:
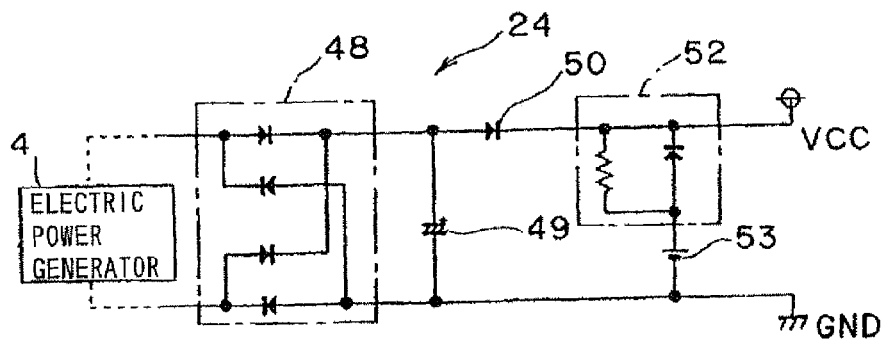
FIG. 9 is a circuit diagram showing a different example of the electric power supply circuit.
Figure 10:
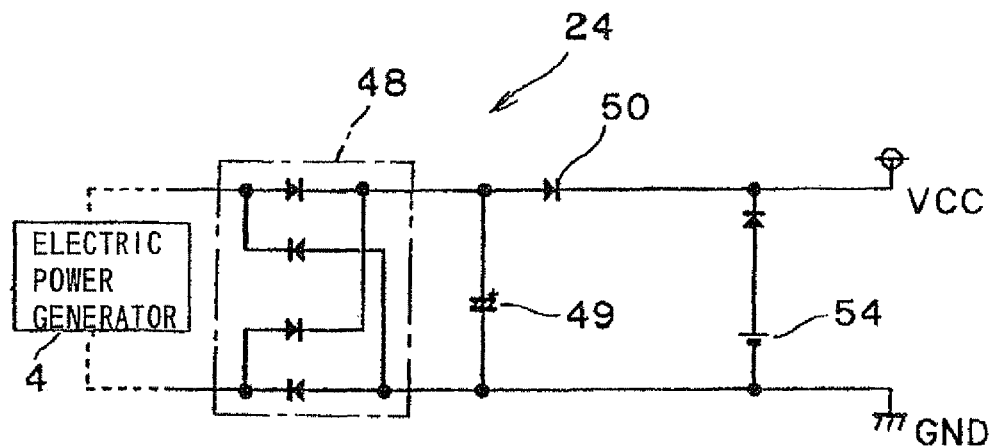
FIG. 10 is a circuit diagram showing a further example of the electric power supply circuit.

FIG. 8 illustrates the details of the electric power supply circuit 24. As shown therein, a voltage signal inputted to the electric power supply circuit 24 from the electric power generator 4 is rectified and smoothed by a rectifier bridge circuit 48 and a smoothing capacitor 49, respectively and is then outputted from an electric power output terminal VCC through a diode 50. The electric power supply circuit 24 includes an electric double layer capacitor 51 connected in a stage following the diode 50 and between the electric power output terminal VCC on a plus side and a ground terminal GDN. This electric double layer capacitor 51 may be, for example, a capacitor having a capacitance of 0.1 F and serves as an accumulator device for accumulating an electric power generated by the electric power generator 4. A parallel circuit 52 comprised of a diode and a resistance is connected between a plus side of the electric double layer capacitor 51 and the electric power output terminal VCC. It is, however, to be noted that in place of the parallel circuit 52 of the diode and the resistor, a Zener diode may be connected parallel to the electric double layer capacitor 51. It is also to be noted that although so far shown in FIG. 8, the electric double layer capacitor 51 has been shown and employed for charging, the electric double layer capacitor 51 may be substituted by a secondary cell 53 as shown in FIG. 9 or a primary cell 54 as shown in FIG. 10.

Figure 11:
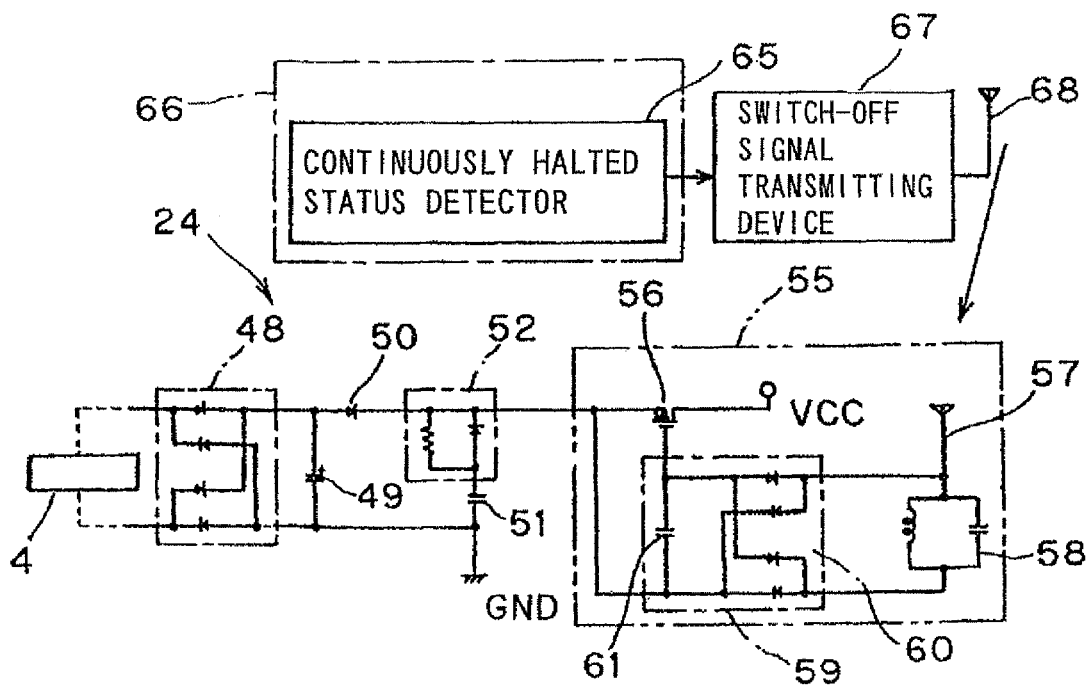
FIG. 11 is a circuit diagram showing a still further example of the electric power supply circuit.
Figure 13:
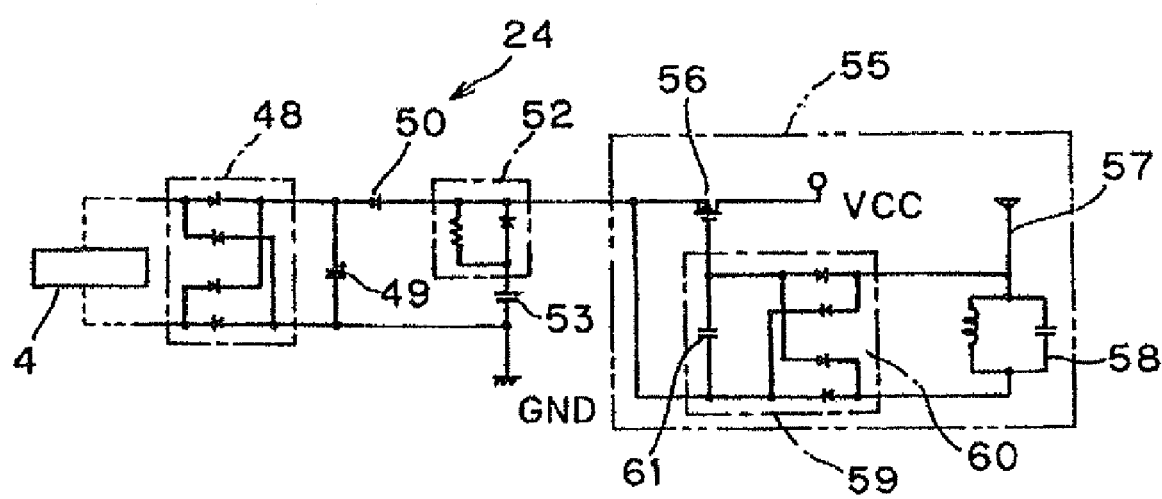
FIG. 13 is a circuit diagram showing a yet different example of the electric power supply circuit.
Figure 14:
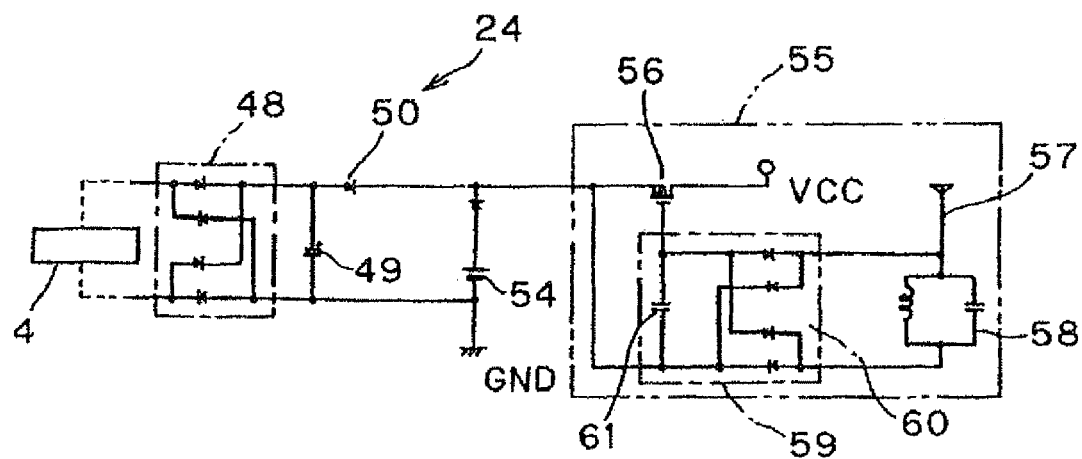
FIG. 14 is a circuit diagram showing a still yet example of the electric power supply circuit.

FIG. 11 illustrates a circuit diagram showing the electric power supply circuit 24 of the design described hereinabove in combination with a switch-off signal transmitting device for transmitting a wireless signal to a wireless switching circuit 55 employed in the electric power supply circuit 24. A major portion of the electric power supply circuit 24 shown in FIG. 11 is substantially similar to that shown and described with reference to FIG. 8. It is, however, to be noted that although in the circuit shown in FIG. 11 the electric double layer capacitor 51 is shown as employed for charging, a secondary cell 53 may be employed in place thereof as shown in FIG. 13. The use of the secondary cell 53 in place of the electric double layer capacitor 51 is effective to minimize a voltage drop resulting from self-discharge to thereby allow the electric power to be sustained for a long period of time. Also, as shown in FIG. 14, in place of the electric double layer capacitor 51, a primary cell 54 may be employed in which case no circuit wiring for charging can advantageously be dispensed with.

The wireless switching circuit 55 is connected between a plus side of the parallel circuit 52 and the electric power output terminal VCC and is operable to selectively initiate or interrupt the supply of the electric power of the electric power supply circuit 24. This wireless switching circuit 55 includes a semiconductor switching element 56 in the form of, for example, a field effect transistor, a receiver antenna 57, a tuning circuit 58 for detecting a radio wave of a particular frequency received by the antenna 57, and a control circuit 59 operable in response to the signal detected by the tuning circuit 58 to selectively switch the semiconductor switching element 56 on or off. The tuning circuit 58 is made up of a parallel circuit including a coil and a capacitor. The control circuit 59 in turn includes a rectifier circuit 60 and a capacitor 61.

Referring to FIG. 11, there is shown a continuously halted status detector 65 provided in a predetermined mechanism 66 mounted in an automobile. The predetermined mechanism 66 referred to previously is a mechanism that differs depending on whether the automobile is in a continuously halted status or in a running status. The continuously halted status detector 65 is operable to detect at least one of continuously halted statuses of the automobile, which statuses may include a condition in which a parking brake is held in a locked position, a condition in which an engine is inactivated, a condition in which an ignition key is removed from an ignition switch, a condition in which a transmission is set to a parking position. A switch-off signal transmitting device 67 includes a transmitting antenna 68 and operates in response to the output status signal from the continuously halted status detector 65 to transmit a wireless signal capable of being detected by the tuning circuit 58 of the wireless switching circuit 55. This switch-off signal transmitting device 67 is disposed at a location adjacent the detecting and transmitting circuit 30 mounted on the vehicle body structure 34 (FIG. 1).

With the wireless switching device shown in FIG. 11, when the continuously halted status detector 65 detects one of the continuously halted statuses of the automobile and the switch-off signal transmitting device 67 subsequently operates in response to the output status signal from the continuously halted status detector 65 to transmit a radio wave of a particular frequency, the tuning circuit 58 receiving such radio wave utilizes an electric power of the detection signal of the radio wave as an electric source with which the semiconductor switching element 56 is turned off to thereby interrupt the supply of the electric power from the electric power supply circuit 24 to the transmitting device 5A. Specifically, the switch-off signal is in the form of a signal in which an output of a continuously transmitted signal is turned off. In other words, during the absence of the output status signal (detection signal) from the continuously halted status detector 65, the switch-off signal transmitting device 67 continuously transmits an ON signal necessary to turn the semiconductor switching element 56 on, but in the presence of the output status signal from the continuously halted status detector 65, it transmits an OFF signal necessary to turn the semiconductor switching element 56 off.

Since the wireless switching device discussed above is of the design that utilizes the electric power of the detection signal of the radio wave detected by the tuning circuit 58 as an electric power source for turning the semiconductor switching element 56 on or off selectively, it need not be electrically powered by either the electric power generator 4 or the electric double layer capacitor 51. Also, since the radio wave transmitted from the switch-off signal transmitting device 67 is selected by the tuning circuit 58, the semiconductor switching element 56 can be selectively switched on or off by the intensity of the radio wave of a particular frequency matched with the tuning frequency.

The operation of the wireless switching device will now be described. Referring to FIG. 1, the signal indicative of the rotational speed of the inner member 2 relative to the outer member 1 and, hence, the vehicle wheel can be obtained, not from the voltage signal generated by the electric power generator 4, but from an output signal of the magnetic sensor 23 built in the stator 17. Specifically, the magnetic sensor detects the frequency of change of the alternating magnetic poles in the rotor 18 of the electric power generator 4 which then serves as a magnetic encoder and provides the signal indicative of the rotational speed of the vehicle wheel in terms of the frequency of change of the alternating magnetic poles. The electric power generated by the electric power generator 4 is used as an electric power for the magnetic sensor 13 and the transmitting device 5A. Since the electric power generated by the electric power generator 4 is accumulated in the accumulating device (i.e., the electric double layer capacitor 51 or the secondary cell 53) of the electric power supply circuit 24 and the magnetic sensor 23 and the transmitting device 5A can therefore be electrically powered by the accumulating device or the primary cell 54 in the event that the electric power generated by the electric power generator 4 is insufficient, the rotational speed of the inner member 2 and, hence, the vehicle wheel can be detected satisfactorily even at an extremely low speed rotation.

More specifically, although the claw-pole type electric power generator 4 of the structure hereinbefore described can be manufactured compact in size having the multi-pole feature, it may be thought that since the electric power generated thereby at a low speed rotation of the vehicle wheel is low, the electric power generator 4 cannot be utilized as an electric power source. However, in the illustrated embodiment of the present invention, the voltage accumulating circuit including the electric double layer capacitor 51 or the secondary cell 53 is employed in the electric power supply circuit 24 and, accordingly, the electric power generated by the electric power generator 4 during a run of the automobile can be charged in the matter of a few seconds. It is generally considered that the elapsed time till a braking action would take about 0.8 second, the free running time (in the braking action) would take about 0.8 second and the braking time (actually effective braking time in the braking action) would take about 0.2 second (assuming that the initial speed of the automobile at the time of braking is 5 km per hour and the braking distance would take 5 meters). By way of example, if the electric power charged in the electric double layer capacitor 51 is used, the electric power so charged can be utilized for 10 seconds or longer as an electric power source for the magnetic sensor 23 and the transmitting device 5A. Accordingly, the supply of the electric power can be effected even when the number of revolution attains a value equal to or lower than 20 rpm (corresponding to the vehicle speed of 2 to 3 km per hour) and the rotation signal outputted from the magnetic sensor and indicative of the rotational speed can be detected by the control circuit 36 (FIG. 1) as a sensor output before the rotational speed of the vehicle wheel attains zero rpm (corresponding to the vehicle speed of 0 km per hour). Thus, detection is possible so long as revolution of the magnetic pole to pole gaps of the rotor 18 comprised of the multi-pole magnet is available.

While the anti-skid braking system is known as a system for securing the steering stability during deceleration, if the electric power is accumulated during a high speed drive so that reduction of the electric power can be compensated for during the deceleration, the anti-skid braking system embodying the present invention can be stably operated even when the automobile runs at an extremely low speed, for example, at a barely zero speed, as compared with the electric power being relied solely on the electric power generator 4.

Also, where the electric power supply circuit 24 is provided with the wireless switching device, that is the wireless switching circuit 55 shown in FIG. 11, in the event that the automobile is continuously held, for example, in the status in which an automobile parking brake is held in a locked position, the continuously halted status detector 65 can detects such status of the automobile and, in response to the output from the continuously halted status detector 65, the switch-off signal transmitting device 67 interrupts transmission of the radio wave for switching to the wireless switching circuit 55 to thereby switch the semiconductor switching element 56 off. Once this occurs, the supply of the accumulated electric power from the accumulating device (e.g., the electric double layer capacitor 51) to the magnetic sensor 23 and the transmitting device 5A can be interrupted to thereby suppress a possible waste of the electric power accumulated in the accumulating circuit. In the event that the parking brake is released from the locked position, the transmission of the radio wave for switching from the switch-off signal transmitting device 67 is resumed to switch the semiconductor switching element 56 on so that supply of the electric power to the magnetic sensor 23 and the transmitting device 5A can resume to enable detection of the rotational speed of the vehicle wheel.

Figure 12:
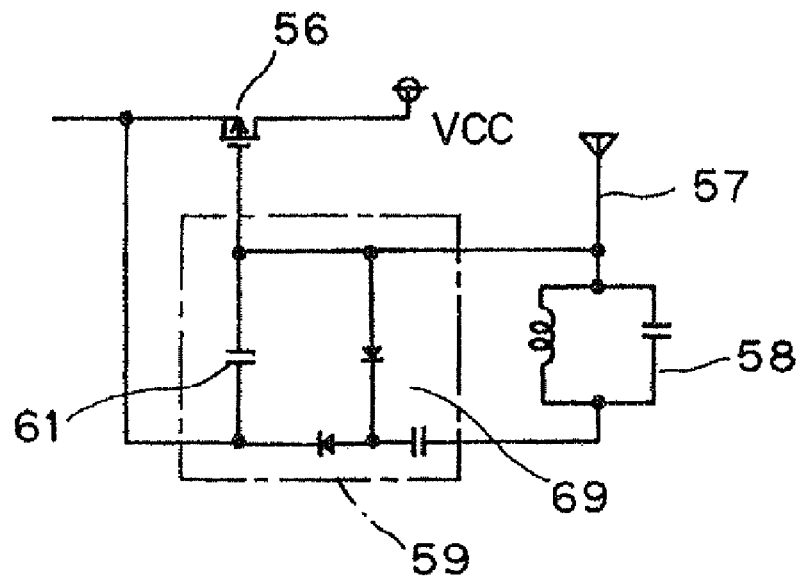
FIG. 12 is a circuit diagram showing an example of a boosting circuit employed in the electric power supply circuit.

It is to be noted that in the electric power supply circuit 24 shown in FIG. 11, a boosting circuit 69 including, for example, a diode and a capacitor as shown in FIG. 12 may be provided at the place of the rectifier circuit 60 so as to ensure that the semiconductor switching element 56 can be assuredly turned off by the electric power source represented by the power of the detection signal of the radio wave obtained from the tuning circuit 58. Even in the electric power supply circuit 24 of a structure shown in any one of FIGS. 13 and 14, a similar boosting circuit 69 as discussed above may be employed for the same purpose.

Figure 15:
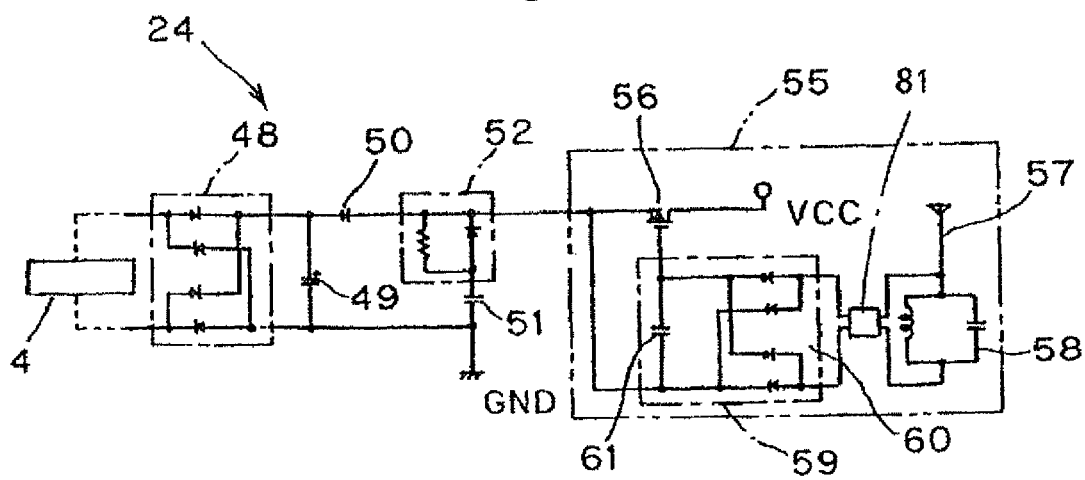
FIG. 15 is a circuit diagram showing a still different example of the electric power supply circuit.

Again in the electric power supply circuit 24 of the circuit design shown in FIG. 11, an surface acoustic wave filter 81 may be interposed between the tuning circuit 58 and the rectifier circuit 60 as shown in FIG. 15 to improve the selectivity of the particular frequency from the switch-off signal transmitting device 67 to avoid any possible erroneous operation which would otherwise be caused by an external radio wave. Even with the electric power supply circuit 24 of the circuit design shown in any one of FIGS. 13 and 14, a similar surface acoustic wave filter 81 as discussed above may be employed.

Figure 6A:
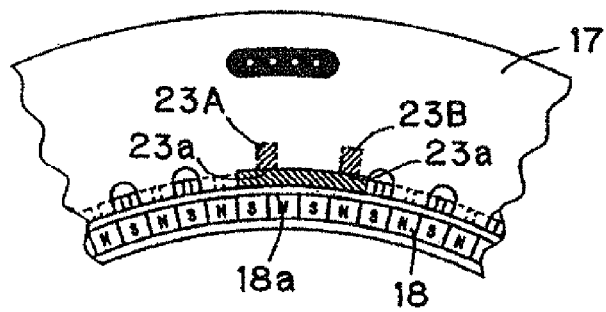
FIG. 6A is a fragmentary view, on an enlarged scale, of a different example of the electric power generator as viewed from the axial direction of such generator, showing two magnetic sensors mounted on the stator.
Figure 6B:
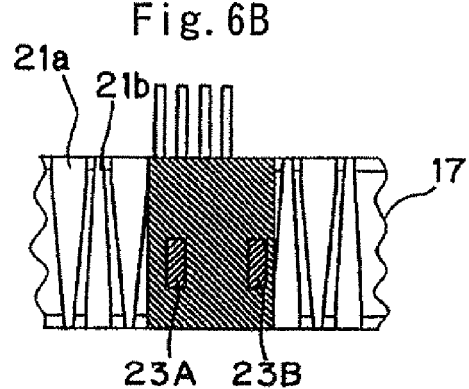
FIG. 6B is a fragmentary view, on an enlarged scale, of the different electric power generator of FIG. 6A as viewed in a direction radially outwardly of the stator of the electric power generator.

It is to be noted that in the example shown in FIG. 5, reference has been made to the use of only one magnetic sensor 23, but two magnetic sensors may be equally employed as shown in FIGS. 6A and 6B. FIG. 6A illustrates a portion of the wheel support bearing assembly where the two magnetic sensors 23A and 23B are disposed, as viewed from the axial direction of the electric power generator, whereas FIG. 6B illustrates the same portion of the wheel support bearing assembly, as viewed in a direction radially outwardly of the stator of the electric power generator. As shown therein, the two magnetic sensors 23A and 23B are so disposed as to align with respective positions displaced 90° in phase of the cycle of alternating repetition of the opposite magnetic poles of the rotor 18. In other words, the two magnetic sensors 23A and 23B are so disposed at respective positions spaced about 90° in terms of the electric phase angle of the detection signal. In order for those magnetic sensors 23A and 23B to be so disposed on the stator 17, two of the pawls 21a integral with the ring member 19 of the stator 17 and corresponding two of the pawls 21b integral with the ring member 19 of the stator 17 are depleted to provide respective sensor windows.

The provision of the magnetic sensors 23A and 23B having such a phase difference as discussed above enables detection of the direction of rotation of the vehicle wheel from the detection signals generated by those magnetic sensors 23A and 23B.

Figure 16A:
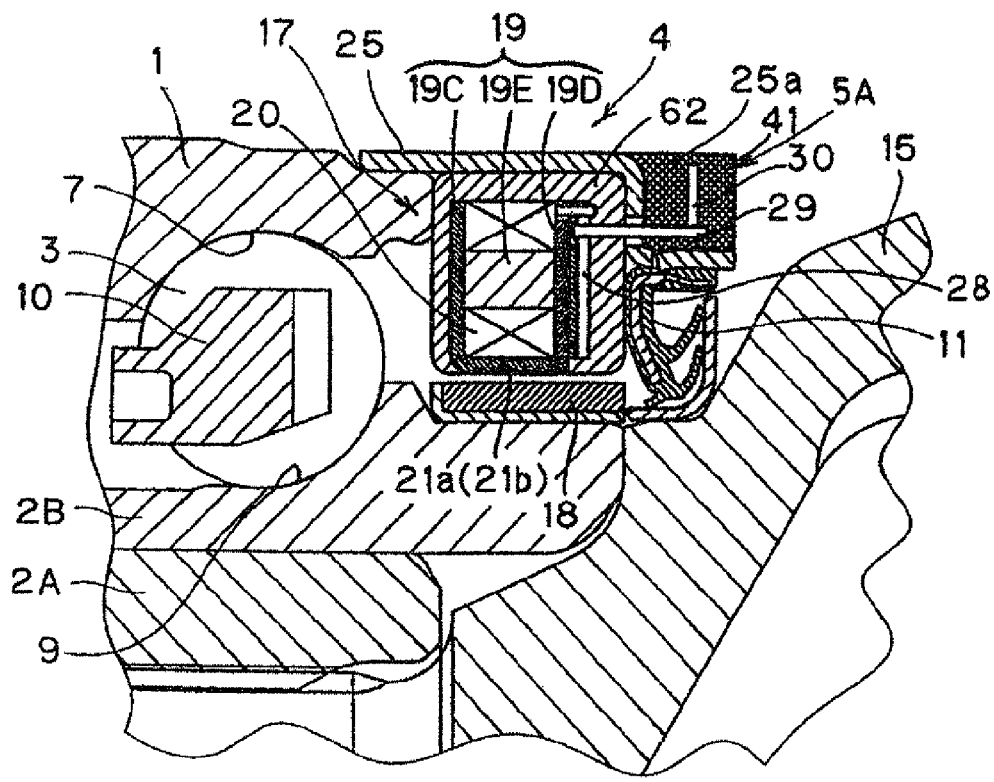
FIG. 16A is a fragmentary longitudinal sectional view showing the details of a portion of the electric power generator where no magnetic sensor is disposed, in accordance with a second preferred embodiment of the present invention.
Figure 16B:
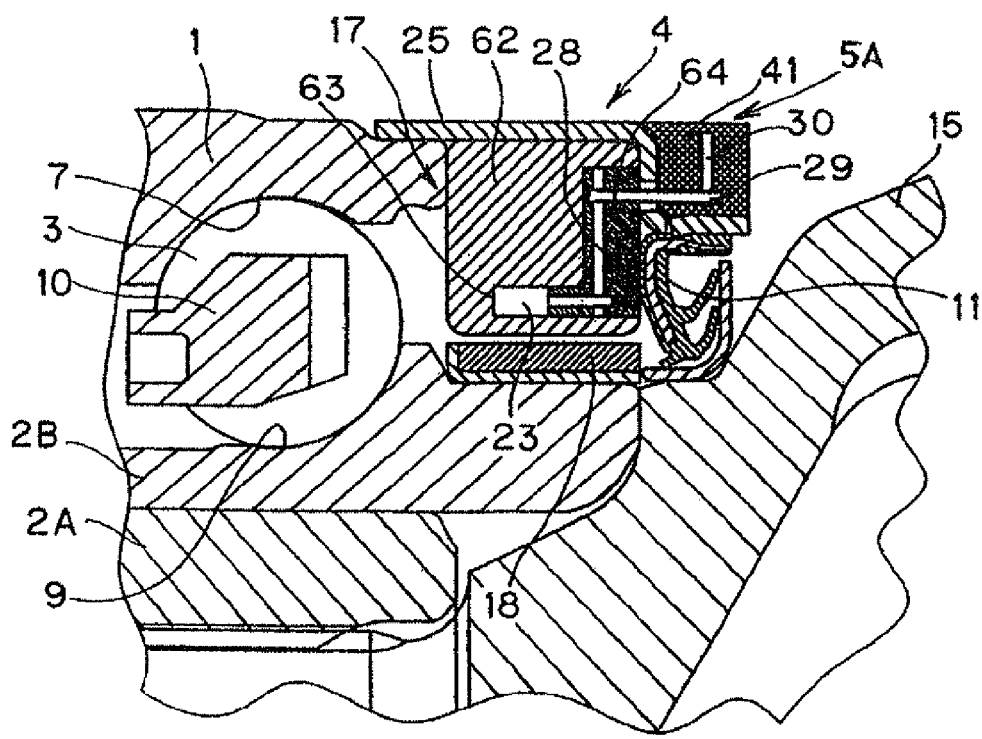
FIG. 16B is a view similar to FIG. 16A showing the details of another portion of the electric power generator where a magnetic sensor is disposed, in accordance with the second preferred embodiment of the present invention.

Hereinafter, a second preferred embodiment of the present invention will be described with particular reference to FIGS. 16A to 18. FIG. 16A illustrates, in a longitudinal sectional representation, a disposition of the electric power generator 4, whereas FIG. 16B illustrates, in a similarly longitudinal sectional representation, a disposition of the magnetic sensor 23 in the electric power generator 4 shown in FIG. 16A. This embodiment is substantially similar to the first embodiment shown in and described with reference to FIGS. 1 to 15, except that in the embodiment shown in FIGS. 16A to 18, the generally tubular ring member 19 forming the yoke of the generator stator 17 includes first and second ring forming segments 19C and 19D of a generally inverted U-shaped section combined together as best shown in FIG. 16A, and a third ring forming segment 19E bridging axially between respective radial walls of the first and second ring forming segments 19C and 19D. The ring forming segment 19C has its radially inner edge formed integrally with pawls 21a and 21b and, on the other hand, the coil 20 is mounted around the third ring forming segment 19E. With this ring member 19 of the structure described above, magnetic fluxes emanating from the generator rotor 18 can extend from the rotor 19, specifically the pawls 21a and 21b through the first ring forming segment 19C, then through the third ring forming segment 19E, then through the second ring forming segment 19D and finally back to the rotor 18, accordingly, such magnetic fluxes can interlink with the coil 20 wound around the third ring forming segment 19E then serving as a bridge.

Thus, where the ring member 19 is so constructed as hereinabove described, the ring member 19 is unable to be directly mounted into the ring-shaped support member 25. However, the first and second ring forming segments 19C and 19D are formed with respective engagement holes (not shown) for engagement with engagement pins (also not shown) formed at respective ends of the third ring forming segment 18E and, accordingly, the generator stator 17 can be completed by preassembling the ring member 19 with the engagement pins in the third ring forming segment 19E engaged in the corresponding engagement holes in the first and second ring forming segments 19C and 19D and subsequently filling a molding 62 of an elastic material around the preassembly.

Figure 17:
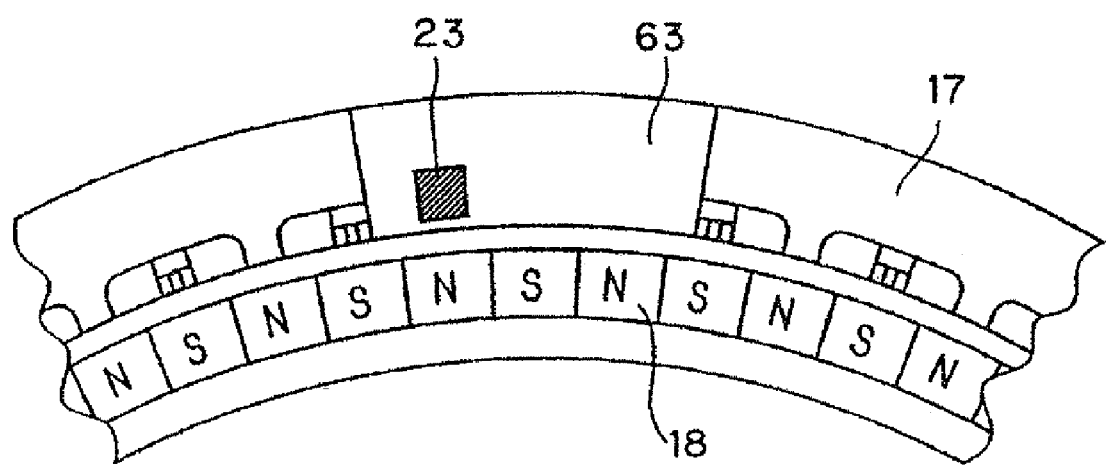
FIG. 17 is a fragmentary view of the electric power generator of FIGS. 16A and 16B as viewed from the direction conforming to the axial direction of such generator.

In the generator stator 17 so assembled in the manner described above, the stator 17 has a portion 63 in its circumferential direction where the coil 20 is absented as best shown in FIG. 16B. After the formation of the molding 62, the magnetic sensor 23 is disposed in the absented portion 63 and is thereafter covered by a molding 64 of an elastic material filling up around the magnetic sensor 23 to thereby allow the magnetic sensor 23 to be embedded in the stator 17. FIG. 17 illustrates the position of the magnetic sensor 23 in the stator 17 as viewed from the direction conforming to the axial direction of the electric power generator 4. Other structural features of the electric power generator shown in FIGS. 16A and 16B than those described above are similar to those shown and described in connection with the previously described first embodiment.

Figure 18:
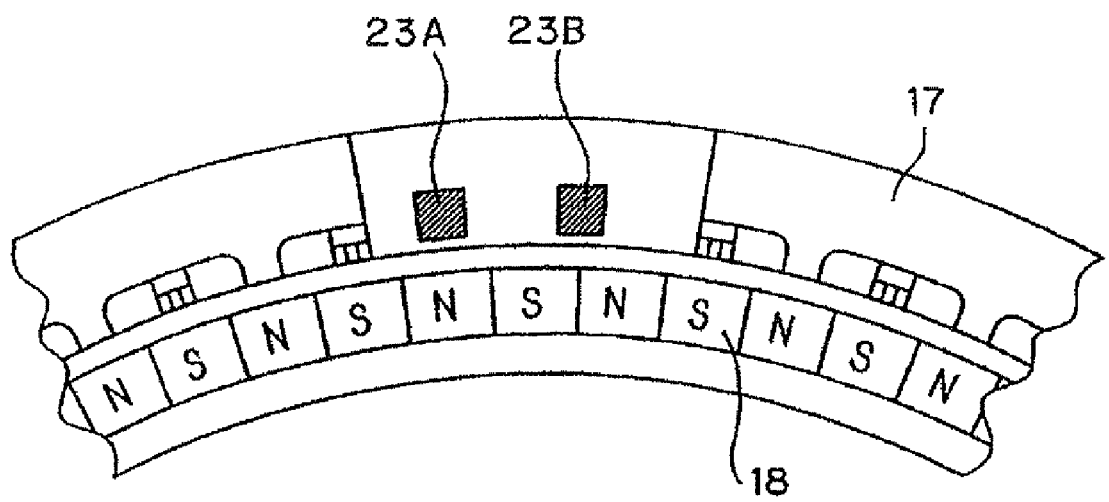
FIG. 18 is a fragmentary view of the electric power generator where two magnetic sensors are disposed on the stator, as viewed from the direction conforming to the axial direction of such generator.

FIG. 18 illustrates a modified form of the second embodiment of FIGS. 16A to 17, in which two magnetic sensors 23A and 23B are employed, as viewed from the direction conforming to the axial direction of the electric power generator. The first and second magnetic sensors 23A and 23B are so disposed as to align with respective positions displaced 90° in phase of the cycle of alternating repetition of the opposite magnetic poles of the generator rotor 18. Accordingly, the provision of the first and second magnetic sensors 23A and 23B enables detection of the direction of rotation of the vehicle wheel from the detection signals generated by those magnetic sensors 23A and 23B by the reason discussed previously in connection with the first embodiment with reference to FIGS. 6A and 6B.

Figure 19:
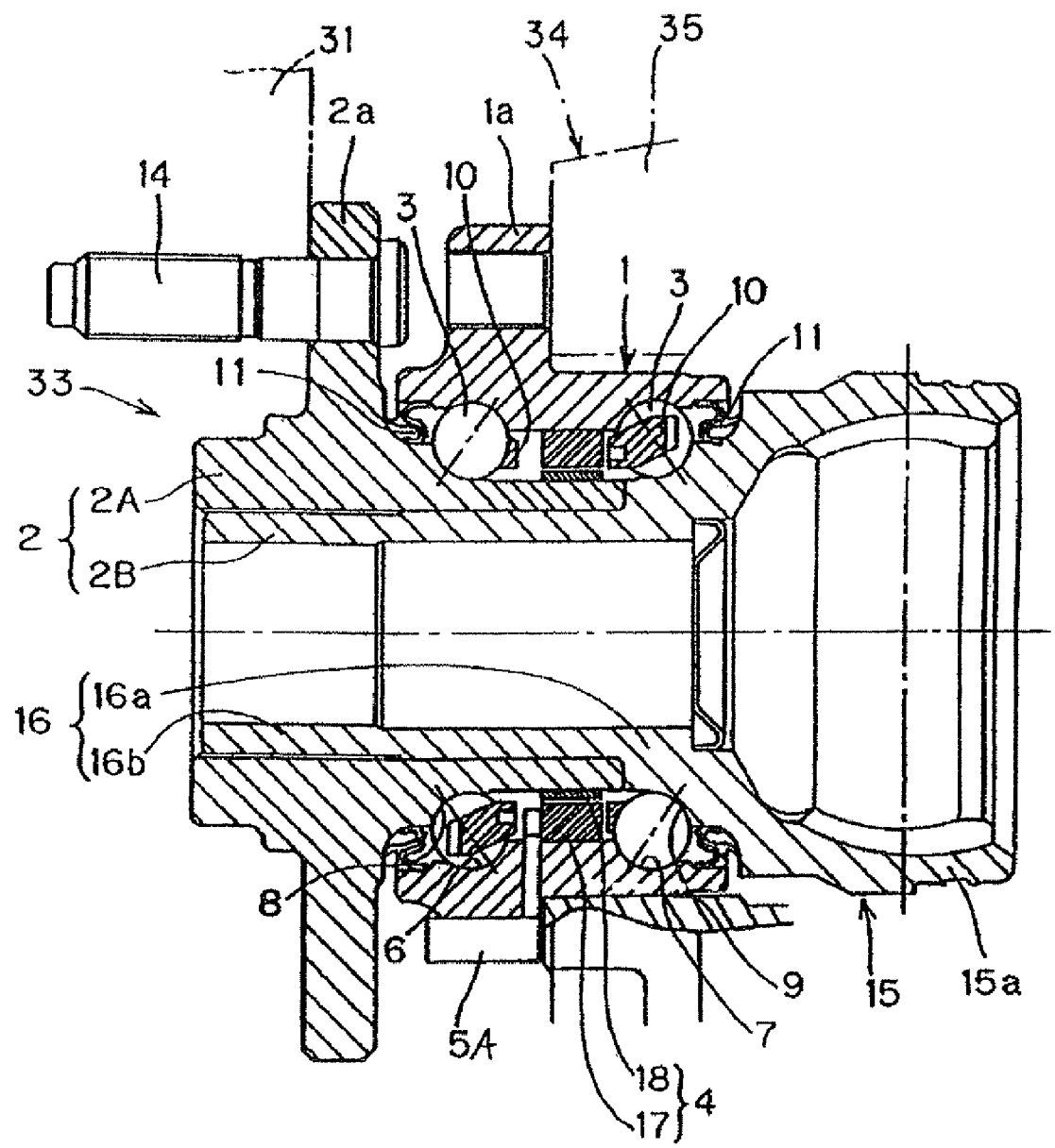
FIG. 19 is a longitudinal sectional view of the wheel support bearing assembly according to a third preferred embodiment of the present invention.

A third preferred embodiment of the present invention is shown in FIG. 19. This third embodiment is substantially similar to the first embodiment shown in and described with reference to FIGS. 1 to 15, except that the wheel support bearing assembly 33 shown in FIG. 19 is of an inner race rotating type of a fourth generation in which the inner member 2 includes a hub wheel 2A and an inner race forming member 2B comprised of the axle 16 of the constant velocity joint 15. In this inner race rotating type, one of the inner raceways 9 on the inner member 2 is formed on an outer peripheral surface of a large diameter portion 16a of the axis 16 of the constant velocity joint 15. The axle 16 also has a reduced diameter portion 16b fitted into the hub wheel 2A. In this embodiment shown in FIG. 19, the electric power generator 4 is disposed between the circular rows of the rolling elements 3 and 3 rollingly accommodated within the annular space delimited between the inner and outer members 2 and 1. Other structural features of the third embodiment than those described above are similar to those shown and described in connection with the first embodiment.

Figure 20A:
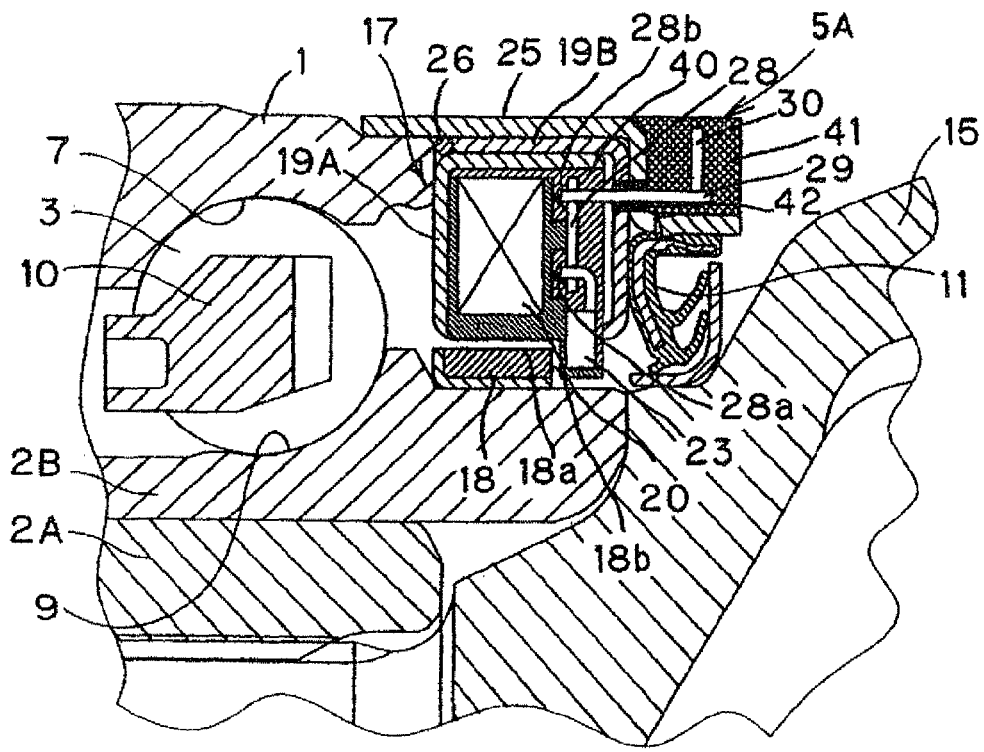
FIG. 20A is a fragmentary longitudinal sectional view showing the details of a portion of the electric power generator where a magnetic sensor is disposed, in accordance with a fourth preferred embodiment of the present invention.
Figure 20B:
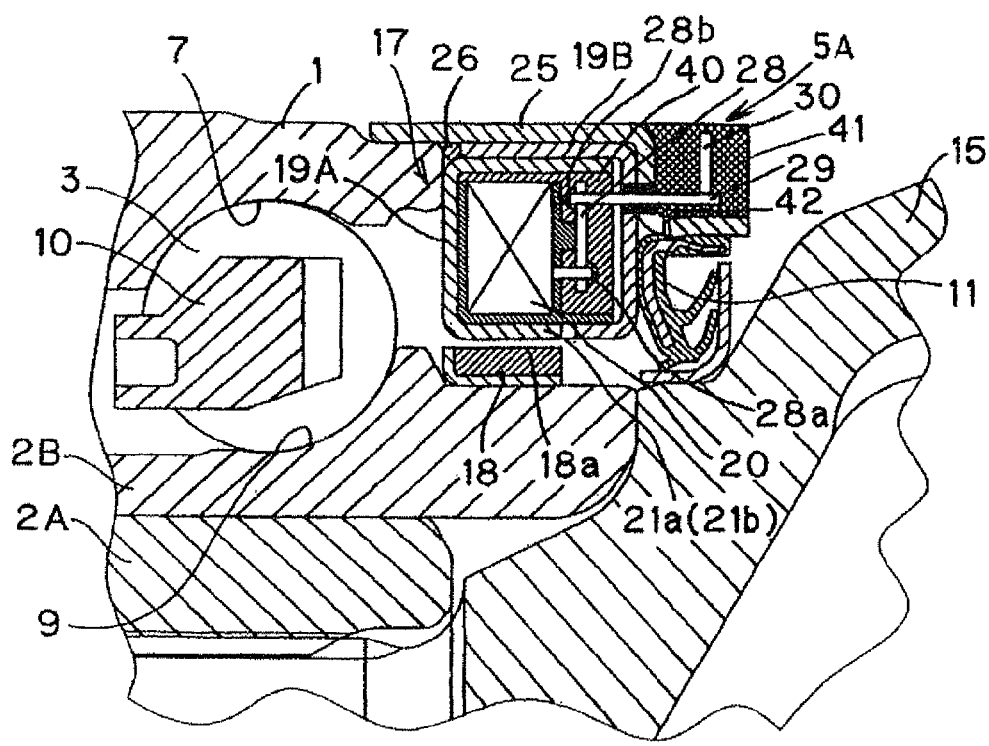
FIG. 20B is a view similar to FIG. 20A showing the details of another portion of the electric power generator where no magnetic sensor is disposed, in accordance with the fourth preferred embodiment of the present invention.

FIGS. 20A and 20B illustrate a fourth preferred embodiment of the present invention. This fourth embodiment is substantially similar to the first embodiment shown in and described with reference to FIGS. 1 to 15, except that the magnetic sensor 23 built in the generator stator 17 is of an axial design with its sensing surface 23a oriented axially so as to confront an annular end face 18b of the rotor 18 mounted on the inner member 2. The electric power generator 4 itself is of a radial design in which the generator stator 17 is oriented so as to confront the rotor 18 on the inner member 2 radially. Other structural features of the fourth embodiment than those described above are similar to those shown and described in connection with the first embodiment.

Figure 21A:
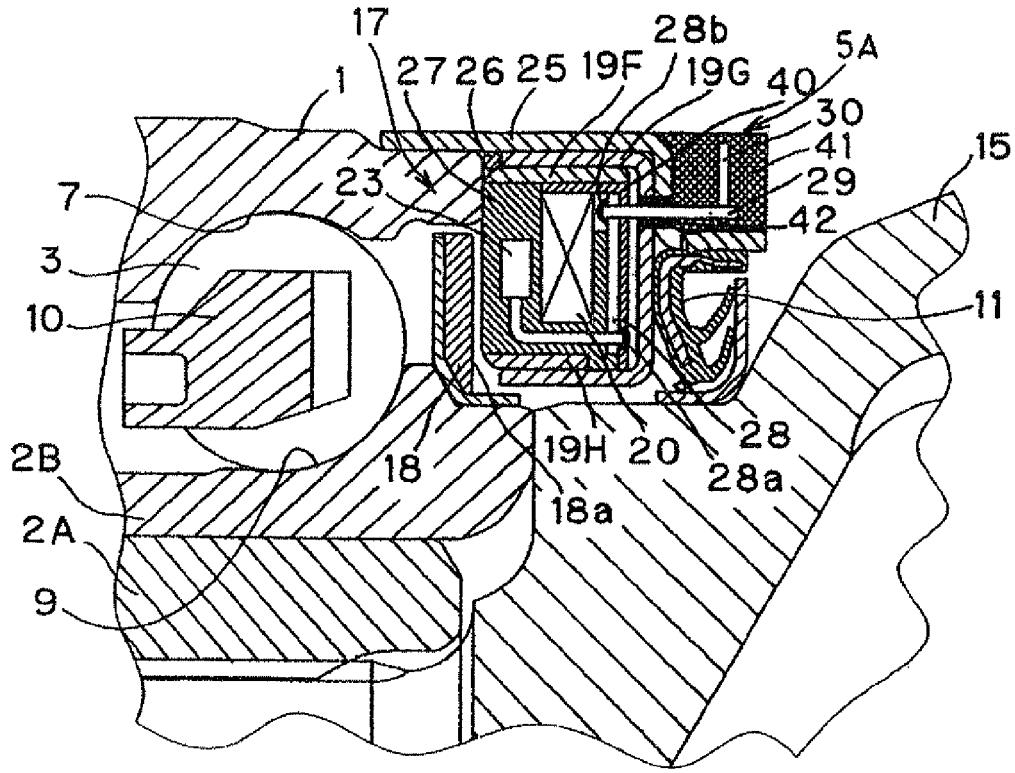
FIG. 21A is a fragmentary longitudinal sectional view showing the details of a portion of the electric power generator where a magnetic sensor is disposed, in accordance with a fifth preferred embodiment of the present invention.
Figure 21B:
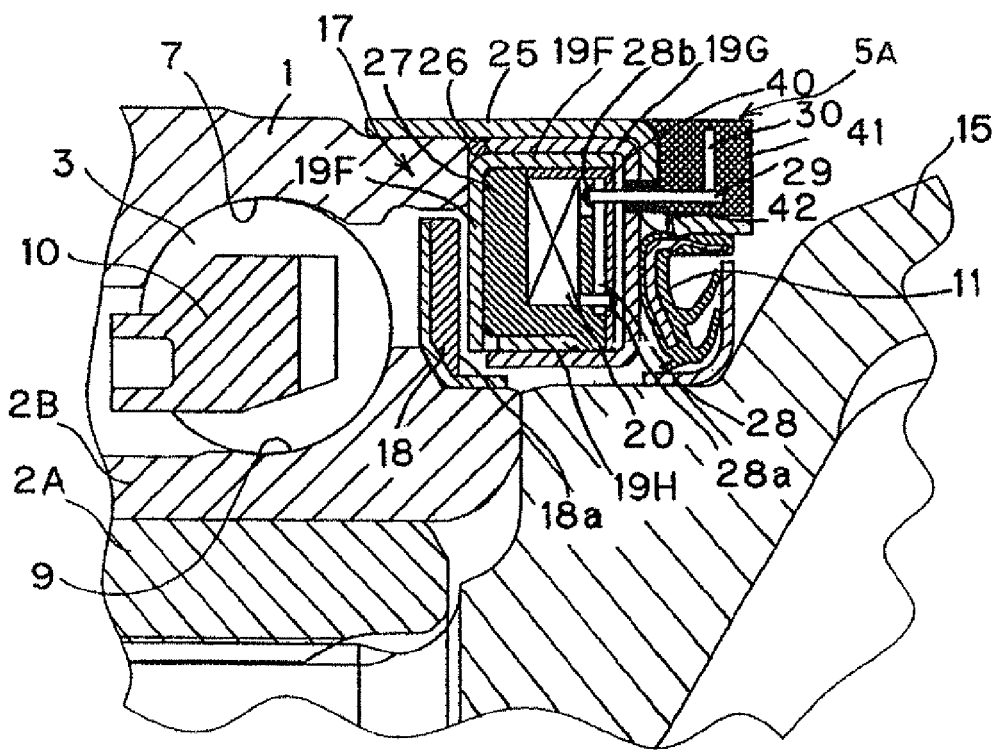
FIG. 21B is a view similar to FIG. 21A showing the details of another portion of the electric power generator where no magnetic sensor is disposed, in accordance with the fifth preferred embodiment of the present invention.
Figure 22:
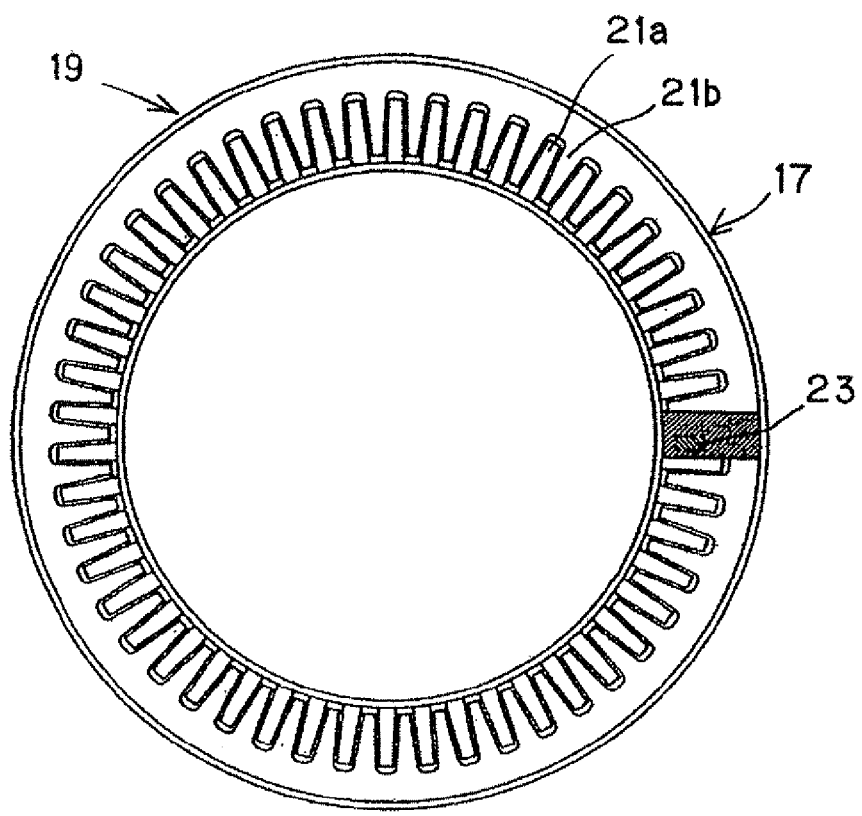
FIG. 22 is a view of the stator employed in the electric power generator shown in FIGS. 21A and 21B, as viewed from the direction conforming to the axial direction of such generator.
Figure 23:
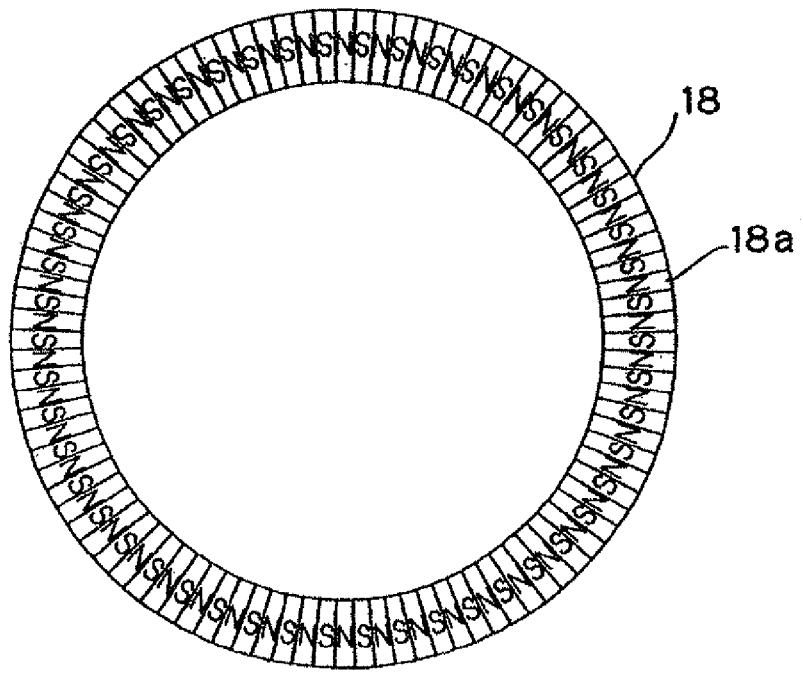
FIG. 23 is a view of the rotor employed in the electric power generator shown in FIGS. 21A and 21B, as viewed from the direction conforming to the axial direction of such generator.
Figure 24A:
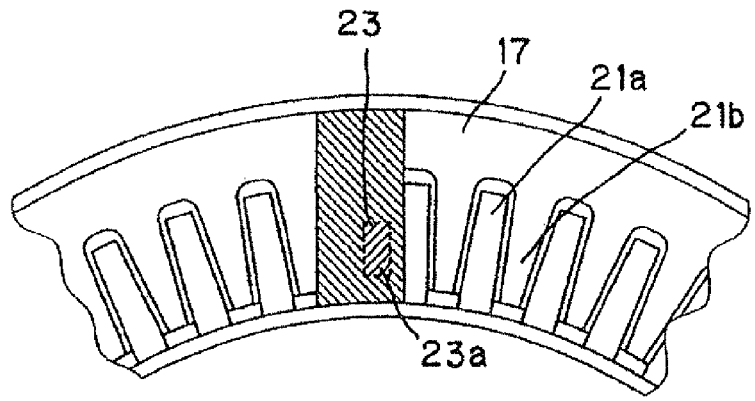
FIG. 24A is a fragmentary view, on an enlarged scale, showing the stator of the electric power generator of FIGS. 21A and 21B as viewed from the direction conforming to the axial direction of such generator.
Figure 24B:
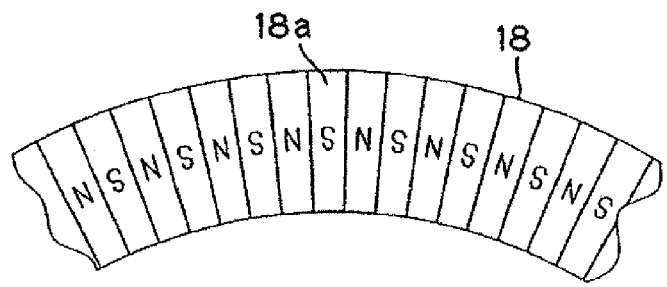
FIG. 24B is a fragmentary view, on an enlarged scale, showing the rotor of the electric power generator of FIGS. 21A and 21B as viewed from the direction conforming to the axial direction of such generator.

FIGS. 21A to 25B illustrate a fifth preferred embodiment of the present invention. Specifically, FIG. 21A illustrates a fragmentary longitudinal sectional view of a portion of the electric power generator where a magnetic sensor is disposed, whereas FIG. 21B illustrates another portion of the electric power generator where the magnetic sensor is not disposed. This fifth embodiment is substantially similar to the first embodiment shown and described in connection with the first embodiment, except that the electric power generator 4 is designed to be an axial type and, at the same time, the magnetic sensor 23 is also designed to be an axial type. In other words, the generator rotor 19 mounted on the inner member 2 is so disposed as to permit the magnetized surface 18 having the alternating magnetic poles N and S arranged in the circumferential direction thereof to be oriented axially. This generator rotor 18 as viewed from the axial direction is shown in FIG. 23. Also, the ring member 19 of the generator stator 17 is comprised of first, second and third ring forming segments 19F, 19G and 19H. This ring member 19 employed in the fifth embodiment is shown in FIG. 22 as viewed from the axial direction. One end portion of this ring member 19 confronting the rotor 18 has a plurality of radially outwardly extending pawls 21a and 21b that are juxtaposed in the circumferential direction of the ring member 19. Those pawls 21a and 21b are circumferentially juxtaposed at intervals of a pitch equal to that between the neighboring opposite magnetic poles N and S in the rotor 18. As is the case with any one of the foregoing embodiments, some of the pawls 21a and 21b are depleted to define the sensor window in which the magnetic sensor 23 is accommodated so as to confront the magnetized surface 18a of the rotor 18 therethrough. FIG. 24A illustrates the portion where the magnetic sensor 23 is disposed in the stator 17 as viewed from the direction conforming to the axial direction of the electric power generator, whereas FIG. 24B illustrates a portion of the rotor 18 held in face-to-face relation with the magnetic sensor shown in FIG. 24A, as viewed from the direction conforming to the axial direction of the electric power generator. Other structural features of the fifth embodiment than those described above are similar to those shown and described in connection with the first embodiment.

Figure 25A:
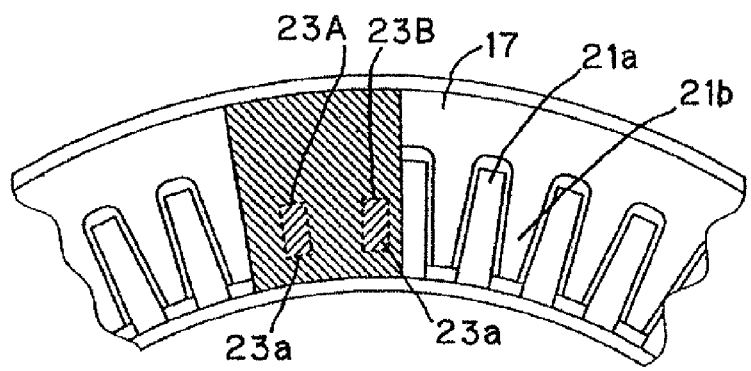
FIG. 25A is a fragmentary view, on an enlarged scale, showing the stator of an example of the electric power generator in which two magnetic sensors are disposed on the stator, as viewed from the direction conforming to the axial direction of such generator.
Figure 25B:
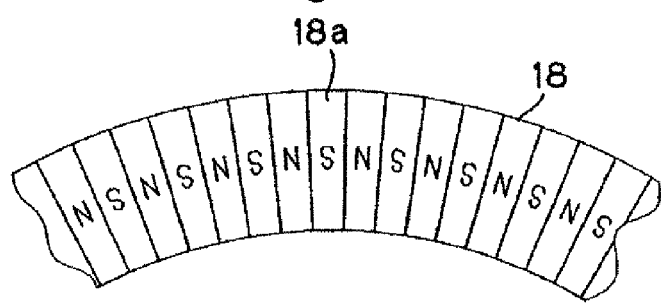
FIG. 25B is a fragmentary view, on an enlarged scale, showing the rotor of the electric power generator of FIG. 25A as viewed from the direction conforming to the axial direction of such generator.

FIGS. 25A and 25B illustrate the example in which the two magnetic sensors 23A and 23B are disposed in the stator 17, as viewed from the direction conforming to the axial direction of the electric power generator. In this example, the first and second magnetic sensors 23A and 23B are so disposed as to align with respective positions displaced 90° in phase of the cycle of alternating repetition of the opposite magnetic poles of the rotor 18. Accordingly, even with this example, the provision of the two magnetic sensors 23A and 23B provides the detection signals from which the direction of rotation of the vehicle wheel can be detected.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A rotation detecting device comprising:
   a rotation detector having a capability of detecting the rotational speed and including an electric power generator having a rotor and a stator;
   a transmitting device to wirelessly transmit a rotation signal indicative of the rotational speed detected by the rotation detector;
   an electric power supply circuit to utilize an electric power generated by the electric power generator to electrically power the transmitting device;
   a wireless switching device to selectively switch on or off supply of the electric power from the electric power supply circuit, said wireless switching device including a tuning circuit to detect a radio wave of a particular frequency and a semiconductor switching element interposed in the electric power supply circuit and capable of being selectively turned on or off in response to a detection signal of the radio wave detected by the tuning circuit, said wireless switching device in its entirety being electrically powered by an electric power of the detection signal of the radio wave detected by the tuning circuit.

2. The rotation detecting device as claimed in claim 1, wherein the electric power supply circuit includes an electric component part selected from the group consisting of an electric double layer capacitor, a secondary cell and a primary cell to compensate a reduction of the electric power generated by the electric power generator at a low speed rotation of the rotor.

3. The rotation detecting device as claimed in claim 1, wherein the rotation detector includes a sensor utilizing the electric power generator as an electric power source therefor, the rotational speed being detected by the sensor.

4. The rotation detecting device as claimed in claim 1, wherein the rotor of the electric power generator is mounted on a rotatable member of a wheel support bearing assembly,
   the stator of the electric cower generator is mounted on a non-rotatable member of the wheel support bearing assembly, and
   the signal, transmitted by the wireless transmitting device and indicative of the rotational speed, is used for controlling an automobile anti-skid braking system.

* * * * *

UNITED STATES PATENT AND TRADEMARK OFFICE
CERTIFICATE OF CORRECTION

| | |
|---|---|
| PATENT NO. | : 7,741,838 B2 |
| APPLICATION NO. | : 12/015950 |
| DATED | : June 22, 2010 |
| INVENTOR(S) | : Toru Takahashi et al. |

It is certified that error appears in the above-identified patent and that said Letters Patent is hereby corrected as shown below:

Column 22, Line 27 in Claim 4 delete "cower" and insert -- power --.

Signed and Sealed this
Twenty-fourth Day of May, 2011

David J. Kappos
*Director of the United States Patent and Trademark Office*